(12) United States Patent
Hopkins et al.

(10) Patent No.: US 8,694,303 B2
(45) Date of Patent: Apr. 8, 2014

(54) SYSTEMS AND METHODS FOR TUNING PARAMETERS IN STATISTICAL MACHINE TRANSLATION

(75) Inventors: Mark Hopkins, Bellevue, WA (US); Jonathan May, Los Angeles, CA (US)

(73) Assignee: Language Weaver, Inc., Los Angeles, CA (US)

( * ) Notice: Subject to any disclaimer, the term of this patent is extended or adjusted under 35 U.S.C. 154(b) by 345 days.

(21) Appl. No.: 13/161,401

(22) Filed: Jun. 15, 2011

(65) Prior Publication Data
US 2012/0323554 A1 Dec. 20, 2012

(51) Int. Cl.
*G10L 15/00* (2013.01)

(52) U.S. Cl.
USPC .................................. 704/2; 704/8; 707/760

(58) Field of Classification Search
USPC ......................................... 704/2, 8; 707/760
See application file for complete search history.

(56) References Cited

U.S. PATENT DOCUMENTS

| | | | |
|---|---|---|---|
| 4,502,128 A | 2/1985 | Okajima et al. | |
| 4,599,691 A | 7/1986 | Sakaki et al. | |
| 4,615,002 A | 9/1986 | Innes | |
| 4,661,924 A | 4/1987 | Okamoto et al. | |
| 4,787,038 A | 11/1988 | Doi et al. | |
| 4,791,587 A | 12/1988 | Doi | |
| 4,800,522 A | 1/1989 | Miyao et al. | |
| 4,814,987 A | 3/1989 | Miyao et al. | |
| 4,942,526 A | 7/1990 | Okajima et al. | |
| 4,980,829 A | 12/1990 | Okajima et al. | |
| 5,020,112 A | 5/1991 | Chou | |
| 5,088,038 A | 2/1992 | Tanaka et al. | |
| 5,091,876 A | 2/1992 | Kumano et al. | |
| 5,146,405 A | 9/1992 | Church | |
| 5,167,504 A | 12/1992 | Mann | |
| 5,181,163 A | 1/1993 | Nakajima et al. | |
| 5,212,730 A | 5/1993 | Wheatley et al. | |
| 5,218,537 A | 6/1993 | Hemphill et al. | |
| 5,220,503 A | 6/1993 | Suzuki et al. | |
| 5,267,156 A | 11/1993 | Nomiyama | |
| 5,268,839 A | 12/1993 | Kaji | |

(Continued)

FOREIGN PATENT DOCUMENTS

| | | |
|---|---|---|
| EP | 0469884 | 2/1992 |
| EP | 0715265 | 6/1996 |

(Continued)

OTHER PUBLICATIONS

Ueffing et al., "Using Pos Information for Statistical Machine Translation into Morphologically Rich Languages," In EACL, 2003: Proceedings of the Tenth Conference on European Chapter of the Association for Computational Linguistics, pp. 347-354.

(Continued)

*Primary Examiner* — Daniel D Abebe
(74) *Attorney, Agent, or Firm* — Carr & Ferrell LLP

(57) ABSTRACT

A method for tuning translation parameters in statistical machine translation based on ranking of the translation parameters is disclosed. According to one embodiment, the method includes sampling pairs of candidate translation units from a set of candidate translation units corresponding to a source unit, each candidate translation unit corresponding to numeric values assigned to one or more features, receiving an initial weighting value for each feature, comparing the pairs of candidate translation units to produce binary results, and using the binary results to adjust the initial weighting values to produce modified weighting values.

21 Claims, 7 Drawing Sheets

(56) References Cited

U.S. PATENT DOCUMENTS

| | | |
|---|---|---|
| 5,295,068 A | 3/1994 | Nishino et al. |
| 5,302,132 A | 4/1994 | Corder |
| 5,311,429 A | 5/1994 | Tominaga |
| 5,387,104 A | 2/1995 | Corder |
| 5,408,410 A | 4/1995 | Kaji |
| 5,432,948 A | 7/1995 | Davis et al. |
| 5,442,546 A | 8/1995 | Kaji et al. |
| 5,477,450 A | 12/1995 | Takeda et al. |
| 5,477,451 A | 12/1995 | Brown et al. |
| 5,495,413 A | 2/1996 | Kutsumi et al. |
| 5,497,319 A | 3/1996 | Chong et al. |
| 5,510,981 A | 4/1996 | Berger et al. |
| 5,528,491 A | 6/1996 | Kuno et al. |
| 5,535,120 A | 7/1996 | Chong et al. |
| 5,541,836 A | 7/1996 | Church et al. |
| 5,541,837 A | 7/1996 | Fushimoto |
| 5,548,508 A | 8/1996 | Nagami |
| 5,644,774 A | 7/1997 | Fukumochi et al. |
| 5,675,815 A | 10/1997 | Yamauchi et al. |
| 5,687,383 A | 11/1997 | Nakayama et al. |
| 5,696,980 A | 12/1997 | Brew |
| 5,724,593 A | 3/1998 | Hargrave, III et al. |
| 5,752,052 A | 5/1998 | Richardson et al. |
| 5,754,972 A | 5/1998 | Baker et al. |
| 5,761,631 A | 6/1998 | Nasukawa |
| 5,761,689 A | 6/1998 | Rayson et al. |
| 5,768,603 A | 6/1998 | Brown et al. |
| 5,779,486 A | 7/1998 | Ho et al. |
| 5,781,884 A | 7/1998 | Pereira et al. |
| 5,794,178 A | 8/1998 | Caid et al. |
| 5,805,832 A | 9/1998 | Brown et al. |
| 5,806,032 A | 9/1998 | Sproat |
| 5,819,265 A | 10/1998 | Ravin et al. |
| 5,826,219 A | 10/1998 | Kutsumi |
| 5,826,220 A | 10/1998 | Takeda et al. |
| 5,845,143 A | 12/1998 | Yamauchi et al. |
| 5,848,385 A | 12/1998 | Poznanski et al. |
| 5,848,386 A | 12/1998 | Motoyama |
| 5,855,015 A | 12/1998 | Shoham |
| 5,864,788 A | 1/1999 | Kutsumi |
| 5,867,811 A | 2/1999 | O'Donoghue |
| 5,870,706 A | 2/1999 | Alshawi |
| 5,893,134 A | 4/1999 | O'Donoghue et al. |
| 5,903,858 A | 5/1999 | Saraki |
| 5,907,821 A | 5/1999 | Kaji et al. |
| 5,909,681 A | 6/1999 | Passera et al. |
| 5,930,746 A | 7/1999 | Ting |
| 5,966,685 A | 10/1999 | Flanagan et al. |
| 5,966,686 A | 10/1999 | Heidorn et al. |
| 5,983,169 A | 11/1999 | Kozma |
| 5,987,402 A | 11/1999 | Murata et al. |
| 5,987,404 A | 11/1999 | Della Pietra et al. |
| 5,991,710 A | 11/1999 | Papineni et al. |
| 5,995,922 A | 11/1999 | Penteroudakis et al. |
| 6,018,617 A | 1/2000 | Sweitzer et al. |
| 6,031,984 A | 2/2000 | Walser |
| 6,032,111 A | 2/2000 | Mohri |
| 6,047,252 A | 4/2000 | Kumano et al. |
| 6,064,819 A | 5/2000 | Franssen et al. |
| 6,064,951 A | 5/2000 | Park et al. |
| 6,073,143 A | 6/2000 | Nishikawa et al. |
| 6,077,085 A | 6/2000 | Parry et al. |
| 6,092,034 A | 7/2000 | McCarley et al. |
| 6,119,077 A | 9/2000 | Shinozaki |
| 6,131,082 A | 10/2000 | Hargrave, III et al. |
| 6,161,082 A | 12/2000 | Goldberg et al. |
| 6,182,014 B1 | 1/2001 | Kenyon et al. |
| 6,182,027 B1 | 1/2001 | Nasukawa et al. |
| 6,205,456 B1 | 3/2001 | Nakao |
| 6,206,700 B1 | 3/2001 | Brown et al. |
| 6,223,150 B1 | 4/2001 | Duan et al. |
| 6,233,544 B1 | 5/2001 | Alshawi |
| 6,233,545 B1 | 5/2001 | Datig |
| 6,233,546 B1 | 5/2001 | Datig |
| 6,236,958 B1 | 5/2001 | Lange et al. |
| 6,269,351 B1 | 7/2001 | Black |
| 6,275,789 B1 | 8/2001 | Moser et al. |
| 6,278,967 B1 | 8/2001 | Akers et al. |
| 6,278,969 B1 | 8/2001 | King et al. |
| 6,285,978 B1 | 9/2001 | Bernth et al. |
| 6,289,302 B1 | 9/2001 | Kuo |
| 6,304,841 B1 | 10/2001 | Berger et al. |
| 6,311,152 B1 | 10/2001 | Bai et al. |
| 6,317,708 B1 | 11/2001 | Witbrock et al. |
| 6,327,568 B1 | 12/2001 | Joost |
| 6,330,529 B1 | 12/2001 | Ito |
| 6,330,530 B1 | 12/2001 | Horiguchi et al. |
| 6,356,864 B1 | 3/2002 | Foltz et al. |
| 6,360,196 B1 | 3/2002 | Poznanski et al. |
| 6,389,387 B1 | 5/2002 | Poznanski et al. |
| 6,393,388 B1 | 5/2002 | Franz et al. |
| 6,393,389 B1 | 5/2002 | Chanod et al. |
| 6,415,250 B1 | 7/2002 | van den Akker |
| 6,460,015 B1 | 10/2002 | Hetherington et al. |
| 6,470,306 B1 | 10/2002 | Pringle et al. |
| 6,473,729 B1 | 10/2002 | Gastaldo et al. |
| 6,473,896 B1 | 10/2002 | Hicken et al. |
| 6,480,698 B2 | 11/2002 | Ho et al. |
| 6,490,549 B1 | 12/2002 | Ulicny et al. |
| 6,498,921 B1 | 12/2002 | Ho et al. |
| 6,502,064 B1 | 12/2002 | Miyahira et al. |
| 6,529,865 B1 | 3/2003 | Duan et al. |
| 6,535,842 B1 | 3/2003 | Roche et al. |
| 6,587,844 B1 | 7/2003 | Mohri |
| 6,609,087 B1 | 8/2003 | Miller et al. |
| 6,647,364 B1 | 11/2003 | Yumura et al. |
| 6,691,279 B2 | 2/2004 | Yoden et al. |
| 6,745,161 B1 | 6/2004 | Arnold et al. |
| 6,745,176 B2 | 6/2004 | Probert, Jr. et al. |
| 6,757,646 B2 | 6/2004 | Marchisio |
| 6,778,949 B2 | 8/2004 | Duan et al. |
| 6,782,356 B1 | 8/2004 | Lopke |
| 6,810,374 B2 | 10/2004 | Kang |
| 6,848,080 B1 | 1/2005 | Lee et al. |
| 6,857,022 B1 | 2/2005 | Scanlan |
| 6,885,985 B2 | 4/2005 | Hull |
| 6,901,361 B1 | 5/2005 | Portilla |
| 6,904,402 B1 | 6/2005 | Wang et al. |
| 6,952,665 B1 | 10/2005 | Shimomura et al. |
| 6,983,239 B1 | 1/2006 | Epstein |
| 6,996,518 B2 | 2/2006 | Jones et al. |
| 6,996,520 B2 | 2/2006 | Levin |
| 6,999,925 B2 | 2/2006 | Fischer et al. |
| 7,013,262 B2 | 3/2006 | Tokuda et al. |
| 7,016,827 B1 | 3/2006 | Ramaswamy et al. |
| 7,016,977 B1 | 3/2006 | Dunsmoir et al. |
| 7,024,351 B2 | 4/2006 | Wang |
| 7,031,911 B2 | 4/2006 | Zhou et al. |
| 7,050,964 B2 | 5/2006 | Menzes et al. |
| 7,085,708 B2 | 8/2006 | Manson |
| 7,089,493 B2 | 8/2006 | Hatori et al. |
| 7,103,531 B2 | 9/2006 | Moore |
| 7,107,204 B1 | 9/2006 | Liu et al. |
| 7,107,215 B2 | 9/2006 | Ghali |
| 7,113,903 B1 | 9/2006 | Riccardi et al. |
| 7,143,036 B2 | 11/2006 | Weise |
| 7,146,358 B1 | 12/2006 | Gravano et al. |
| 7,149,688 B2 | 12/2006 | Schalkwyk |
| 7,171,348 B2 | 1/2007 | Scanlan |
| 7,174,289 B2 | 2/2007 | Sukehiro |
| 7,177,792 B2 | 2/2007 | Knight et al. |
| 7,191,115 B2 | 3/2007 | Moore |
| 7,194,403 B2 | 3/2007 | Okura et al. |
| 7,197,451 B1 | 3/2007 | Carter et al. |
| 7,206,736 B2 | 4/2007 | Moore |
| 7,209,875 B2 | 4/2007 | Quirk et al. |
| 7,219,051 B2 | 5/2007 | Moore |
| 7,239,998 B2 | 7/2007 | Xun |
| 7,249,012 B2 | 7/2007 | Moore |
| 7,249,013 B2 | 7/2007 | Al-Onaizan et al. |
| 7,283,950 B2 | 10/2007 | Pournasseh et al. |
| 7,295,962 B2 | 11/2007 | Marcu |
| 7,302,392 B1 | 11/2007 | Thenthiruperai et al. |
| 7,319,949 B2 | 1/2008 | Pinkham |

(56) References Cited

U.S. PATENT DOCUMENTS

| | | |
|---|---|---|
| 7,340,388 B2 | 3/2008 | Soricut et al. |
| 7,346,487 B2 | 3/2008 | Li |
| 7,346,493 B2 | 3/2008 | Ringger et al. |
| 7,349,839 B2 | 3/2008 | Moore |
| 7,349,845 B2 | 3/2008 | Coffman et al. |
| 7,356,457 B2 | 4/2008 | Pinkham et al. |
| 7,369,998 B2 | 5/2008 | Sarich et al. |
| 7,373,291 B2 | 5/2008 | Garst |
| 7,383,542 B2 | 6/2008 | Richardson et al. |
| 7,389,222 B1 | 6/2008 | Langmead et al. |
| 7,389,234 B2 | 6/2008 | Schmid et al. |
| 7,403,890 B2 | 7/2008 | Roushar |
| 7,409,332 B2 | 8/2008 | Moore |
| 7,409,333 B2 | 8/2008 | Wilkinson et al. |
| 7,447,623 B2 | 11/2008 | Appleby |
| 7,454,326 B2 | 11/2008 | Marcu et al. |
| 7,496,497 B2 | 2/2009 | Liu |
| 7,533,013 B2 | 5/2009 | Marcu |
| 7,536,295 B2 | 5/2009 | Cancedda et al. |
| 7,546,235 B2 | 6/2009 | Brockett et al. |
| 7,552,053 B2 | 6/2009 | Gao et al. |
| 7,565,281 B2 | 7/2009 | Appleby |
| 7,574,347 B2 | 8/2009 | Wang |
| 7,580,830 B2 | 8/2009 | Al-Onaizan et al. |
| 7,587,307 B2 * | 9/2009 | Cancedda et al. ............ 704/2 |
| 7,620,538 B2 | 11/2009 | Marcu et al. |
| 7,620,632 B2 | 11/2009 | Andrews |
| 7,624,005 B2 | 11/2009 | Koehn et al. |
| 7,624,020 B2 | 11/2009 | Yamada et al. |
| 7,627,479 B2 | 12/2009 | Travieso et al. |
| 7,680,646 B2 | 3/2010 | Lux-Pogodalla et al. |
| 7,689,405 B2 | 3/2010 | Marcu |
| 7,698,124 B2 | 4/2010 | Menezes et al. |
| 7,698,125 B2 | 4/2010 | Graehl et al. |
| 7,707,025 B2 | 4/2010 | Whitelock |
| 7,711,545 B2 | 5/2010 | Koehn |
| 7,716,037 B2 | 5/2010 | Precoda et al. |
| 7,801,720 B2 | 9/2010 | Satake et al. |
| 7,813,918 B2 | 10/2010 | Muslea et al. |
| 7,822,596 B2 | 10/2010 | Elgazzar et al. |
| 7,925,494 B2 | 4/2011 | Cheng et al. |
| 7,957,953 B2 | 6/2011 | Moore |
| 7,974,833 B2 | 7/2011 | Soricut et al. |
| 8,060,360 B2 | 11/2011 | He |
| 8,145,472 B2 | 3/2012 | Shore et al. |
| 8,214,196 B2 | 7/2012 | Yamada et al. |
| 8,244,519 B2 | 8/2012 | Bicici et al. |
| 8,265,923 B2 * | 9/2012 | Chatterjee et al. ............ 704/2 |
| 8,615,389 B1 | 12/2013 | Marcu |
| 2001/0009009 A1 | 7/2001 | Iizuka |
| 2001/0029455 A1 | 10/2001 | Chin et al. |
| 2002/0002451 A1 | 1/2002 | Sukehiro |
| 2002/0013693 A1 | 1/2002 | Fuji |
| 2002/0040292 A1 | 4/2002 | Marcu |
| 2002/0046018 A1 | 4/2002 | Marcu et al. |
| 2002/0046262 A1 | 4/2002 | Heilig et al. |
| 2002/0059566 A1 | 5/2002 | Delcambre et al. |
| 2002/0078091 A1 | 6/2002 | Vu et al. |
| 2002/0087313 A1 | 7/2002 | Lee et al. |
| 2002/0099744 A1 | 7/2002 | Coden et al. |
| 2002/0111788 A1 | 8/2002 | Kimpara |
| 2002/0111789 A1 | 8/2002 | Hull |
| 2002/0111967 A1 | 8/2002 | Nagase |
| 2002/0143537 A1 | 10/2002 | Ozawa et al. |
| 2002/0152063 A1 | 10/2002 | Tokieda et al. |
| 2002/0169592 A1 | 11/2002 | Aityan |
| 2002/0188438 A1 | 12/2002 | Knight et al. |
| 2002/0188439 A1 | 12/2002 | Marcu |
| 2002/0198699 A1 | 12/2002 | Greene et al. |
| 2002/0198701 A1 | 12/2002 | Moore |
| 2002/0198713 A1 | 12/2002 | Franz et al. |
| 2003/0009322 A1 | 1/2003 | Marcu |
| 2003/0023423 A1 | 1/2003 | Yamada et al. |
| 2003/0144832 A1 | 7/2003 | Harris |
| 2003/0154071 A1 | 8/2003 | Shreve |
| 2003/0158723 A1 | 8/2003 | Masuichi et al. |
| 2003/0176995 A1 | 9/2003 | Sukehiro |
| 2003/0182102 A1 | 9/2003 | Corston-Oliver et al. |
| 2003/0191626 A1 | 10/2003 | Al-Onaizan et al. |
| 2003/0204400 A1 | 10/2003 | Marcu et al. |
| 2003/0216905 A1 | 11/2003 | Chelba et al. |
| 2003/0217052 A1 | 11/2003 | Rubenczyk et al. |
| 2003/0233222 A1 | 12/2003 | Soricut et al. |
| 2004/0006560 A1 | 1/2004 | Chan et al. |
| 2004/0015342 A1 | 1/2004 | Garst |
| 2004/0024581 A1 | 2/2004 | Koehn et al. |
| 2004/0030551 A1 | 2/2004 | Marcu et al. |
| 2004/0035055 A1 | 2/2004 | Zhu et al. |
| 2004/0044530 A1 | 3/2004 | Moore |
| 2004/0059708 A1 | 3/2004 | Dean et al. |
| 2004/0068411 A1 | 4/2004 | Scanlan |
| 2004/0098247 A1 | 5/2004 | Moore |
| 2004/0102956 A1 | 5/2004 | Levin |
| 2004/0102957 A1 | 5/2004 | Levin |
| 2004/0111253 A1 | 6/2004 | Luo et al. |
| 2004/0115597 A1 | 6/2004 | Butt |
| 2004/0122656 A1 | 6/2004 | Abir |
| 2004/0167768 A1 | 8/2004 | Travieso et al. |
| 2004/0167784 A1 | 8/2004 | Travieso et al. |
| 2004/0193401 A1 | 9/2004 | Ringger et al. |
| 2004/0230418 A1 | 11/2004 | Kitamura |
| 2004/0237044 A1 | 11/2004 | Travieso et al. |
| 2004/0260532 A1 | 12/2004 | Richardson et al. |
| 2005/0021322 A1 | 1/2005 | Richardson et al. |
| 2005/0021517 A1 | 1/2005 | Marchisio |
| 2005/0026131 A1 | 2/2005 | Elzinga et al. |
| 2005/0033565 A1 | 2/2005 | Koehn |
| 2005/0038643 A1 | 2/2005 | Koehn |
| 2005/0055199 A1 | 3/2005 | Ryzchachkin et al. |
| 2005/0060160 A1 | 3/2005 | Roh et al. |
| 2005/0075858 A1 | 4/2005 | Pournasseh et al. |
| 2005/0086226 A1 | 4/2005 | Krachman |
| 2005/0102130 A1 | 5/2005 | Quirk et al. |
| 2005/0125218 A1 | 6/2005 | Rajput et al. |
| 2005/0149315 A1 | 7/2005 | Flanagan et al. |
| 2005/0171757 A1 | 8/2005 | Appleby |
| 2005/0204002 A1 | 9/2005 | Friend |
| 2005/0228640 A1 | 10/2005 | Aue et al. |
| 2005/0228642 A1 | 10/2005 | Mau et al. |
| 2005/0228643 A1 | 10/2005 | Munteanu et al. |
| 2005/0234701 A1 | 10/2005 | Graehl et al. |
| 2005/0267738 A1 | 12/2005 | Wilkinson et al. |
| 2006/0004563 A1 | 1/2006 | Campbell et al. |
| 2006/0015320 A1 | 1/2006 | Och |
| 2006/0015323 A1 | 1/2006 | Udupa et al. |
| 2006/0018541 A1 | 1/2006 | Chelba et al. |
| 2006/0020448 A1 | 1/2006 | Chelba et al. |
| 2006/0041428 A1 | 2/2006 | Fritsch et al. |
| 2006/0095248 A1 | 5/2006 | Menezes et al. |
| 2006/0111891 A1 | 5/2006 | Menezes et al. |
| 2006/0111892 A1 | 5/2006 | Menezes et al. |
| 2006/0111896 A1 | 5/2006 | Menezes et al. |
| 2006/0129424 A1 | 6/2006 | Chan |
| 2006/0142995 A1 | 6/2006 | Knight et al. |
| 2006/0150069 A1 | 7/2006 | Chang |
| 2006/0167984 A1 | 7/2006 | Fellenstein et al. |
| 2006/0190241 A1 | 8/2006 | Goutte et al. |
| 2007/0016400 A1 | 1/2007 | Soricutt et al. |
| 2007/0016401 A1 | 1/2007 | Ehsani et al. |
| 2007/0033001 A1 | 2/2007 | Muslea et al. |
| 2007/0050182 A1 | 3/2007 | Sneddon et al. |
| 2007/0078654 A1 | 4/2007 | Moore |
| 2007/0078845 A1 | 4/2007 | Scott et al. |
| 2007/0083357 A1 | 4/2007 | Moore et al. |
| 2007/0094169 A1 | 4/2007 | Yamada et al. |
| 2007/0112553 A1 | 5/2007 | Jacobson |
| 2007/0112555 A1 | 5/2007 | Lavi et al. |
| 2007/0112556 A1 | 5/2007 | Lavi et al. |
| 2007/0122792 A1 | 5/2007 | Galley et al. |
| 2007/0168202 A1 | 7/2007 | Changela et al. |
| 2007/0168450 A1 | 7/2007 | Prajapat et al. |
| 2007/0180373 A1 | 8/2007 | Bauman et al. |
| 2007/0219774 A1 | 9/2007 | Quirk et al. |
| 2007/0250306 A1 | 10/2007 | Marcu et al. |

(56) References Cited

U.S. PATENT DOCUMENTS

| | | | |
|---|---|---|---|
| 2007/0265825 | A1 | 11/2007 | Cancedda et al. |
| 2007/0265826 | A1 | 11/2007 | Chen et al. |
| 2007/0269775 | A1 | 11/2007 | Andreev et al. |
| 2007/0294076 | A1 | 12/2007 | Shore et al. |
| 2008/0052061 | A1 | 2/2008 | Kim et al. |
| 2008/0065478 | A1 | 3/2008 | Kohlmeier et al. |
| 2008/0114583 | A1 | 5/2008 | Al-Onaizan et al. |
| 2008/0154581 | A1 | 6/2008 | Lavi et al. |
| 2008/0183555 | A1 | 7/2008 | Walk |
| 2008/0215418 | A1 | 9/2008 | Kolve et al. |
| 2008/0249760 | A1 | 10/2008 | Marcu et al. |
| 2008/0270109 | A1 | 10/2008 | Och |
| 2008/0270112 | A1 | 10/2008 | Shimohata |
| 2008/0281578 | A1 | 11/2008 | Kumaran et al. |
| 2008/0307481 | A1 | 12/2008 | Panje |
| 2009/0076792 | A1 | 3/2009 | Lawson-Tancred |
| 2009/0083023 | A1 | 3/2009 | Foster et al. |
| 2009/0119091 | A1 | 5/2009 | Sarig |
| 2009/0125497 | A1 | 5/2009 | Jiang et al. |
| 2009/0234634 | A1 | 9/2009 | Chen et al. |
| 2009/0241115 | A1 | 9/2009 | Raffo et al. |
| 2009/0326912 | A1 | 12/2009 | Ueffing |
| 2010/0017293 | A1 | 1/2010 | Lung et al. |
| 2010/0042398 | A1 | 2/2010 | Marcu et al. |
| 2010/0138213 | A1 | 6/2010 | Bicici et al. |
| 2010/0174524 | A1 | 7/2010 | Koehn |
| 2011/0029300 | A1 | 2/2011 | Marcu et al. |
| 2011/0066643 | A1 | 3/2011 | Cooper et al. |
| 2011/0082684 | A1 | 4/2011 | Soricut et al. |
| 2012/0323554 | A1* | 12/2012 | Hopkins et al. .................. 704/2 |

FOREIGN PATENT DOCUMENTS

| | | |
|---|---|---|
| EP | 0933712 A2 | 8/1999 |
| EP | 0933712 A3 | 1/2001 |
| JP | 07244666 | 9/1995 |
| JP | 10011447 | 1/1998 |
| JP | 11272672 | 10/1999 |
| JP | 2004501429 | 1/2004 |
| JP | 2004062726 | 2/2004 |
| JP | 2008101837 | 5/2008 |

OTHER PUBLICATIONS

Frederking et al., "Three Heads are Better Than One," In Proceedings of the 4th Conference on Applied Natural Language Processing, Stuttgart, Germany, 1994, pp. 95-100.
Och et al., "Discriminative Training and Maximum Entropy Models for Statistical Machine Translation," In Proc. of the 40th Annual Meeting of the Association for Computational Linguistics (ACL), Philadelphia, PA, 2002.
Yasuda et al., "Automatic Machine Translation Selection Scheme to Output the Best Result," Proc of LREC, 2002, pp. 525-528.
Papineni et al., "Bleu: a Method for Automatic Evaluation of Machine Translation", Proc. Of the 40th Annual Meeting of the Association for Computational Linguistics (ACL), Jul. 2002, pp. 311-318.
Shaalan et al., "Machine Translation of English Noun Phrases into Arabic", (2004), vol. 17, No. 2, International Journal of Computer Processing of Oriental Languages, 14 pages.
Isahara et al., "Analysis, Generation and Semantic Representation in CONTRAST—A Context-Based Machine Translation System", 1995, Systems and Computers in Japan, vol. 26, No. 14, pp. 37-53.
Proz.com, Rates for proofreading versus Translating, http://www.proz.com/forum/business_issues/202-rates_for_proofreading_versus_translating.html, Apr. 23, 2009, retrieved Jul. 13, 2012.
Celine, Volume discounts on large translation project, naked translations, http://www.nakedtranslations.com/en/2007/volume-discounts-on-large-translation-projects/, Aug. 1, 2007, retrieved Jul. 16, 2012.
Graehl, J and Knight, K, May 2004, Training Tree Transducers, In NAACL-HLT (2004), pp. 105-112.
Niessen et al, "Statistical machine translation with scarce resources using morphosyntactic information", Jun. 2004, Computational Linguistics, vol. 30, issue 2, pp. 181-204.
Liu et al., "Context Discovery Using Attenuated Bloom Filters in Ad-Hoc Networks," Springer, pp. 13-25, 2006.
First Office Action mailed Jun. 7, 2004 in Canadian Patent Application 2408819, filed May 11, 2001.
First Office Action mailed Jun. 14, 2007 in Canadian Patent Application 2475857, filed Mar. 11, 2003.
Office Action mailed Mar. 26, 2012 in German Patent Application 10392450.7, filed Mar. 28, 2003.
First Office Action mailed Nov. 5, 2008 in Canadian Patent Application 2408398, filed Mar. 27, 2003.
Second Office Action mailed Sep. 25, 2009 in Canadian Patent Application 2408398, filed Mar. 27, 2003.
First Office Action mailed Mar. 1, 2005 in European Patent Application No. 03716920.8, filed Mar. 27, 2003.
Second Office Action mailed Nov. 9, 2006 in European Patent Application No. 03716920.8, filed Mar. 27, 2003.
Third Office Action mailed Apr. 30, 2008 in European Patent Application No. 03716920.8, filed Mar. 27, 2003.
Office Action mailed Oct. 25, 2011 in Japanese Patent Application 2007-536911 filed Oct. 12, 2005.
Office Action mailed Jul. 24, 2012 in Japanese Patent Application 2007-536911 filed Oct. 12, 2005.
Final Office Action mailed Apr. 9, 2013 in Japanese Patent Application 2007-536911 filed Oct. 12, 2005.
Office Action mailed May 13, 2005 in Chinese Patent Application 1812317.1, filed May 11, 2001.
Office Action mailed Apr. 21, 2006 in Chinese Patent Application 1812317.1, filed May 11, 2001.
Office Action mailed Jul. 19, 2006 in Japanese Patent Application 2003-577155, filed Mar. 11, 2003.
Office Action mailed Mar. 1, 2007 in Chinese Patent Application 3805749.2, filed Mar. 11, 2003.
Office Action mailed Feb. 27, 2007 in Japanese Patent Application 2002-590018, filed May 13, 2002.
Office Action mailed Jan. 26, 2007 in Chinese Patent Application 3807018.9, filed Mar. 27, 2003.
Office Action mailed Dec. 7, 2005 in Indian Patent Application 2283/DELNP/2004, filed Mar. 11, 2003.
Office Action mailed Mar. 31, 2009 in European Patent Application 3714080.3, filed Mar. 11, 2003.
Agichtein et al., "Snowball: Extracting Information from Large Plain-Text Collections," ACM DL '00, the Fifth ACM Conference on Digital Libraries, Jun. 2, 2000, San Antonio, TX, USA.
Satake, Masaomi, "Anaphora Resolution for Named Entity Extraction in Japanese Newspaper Articles," Master's Thesis [online], Feb. 15, 2002, School of Information Science, JAIST, Nomi, Ishikaw, Japan.
Office Action mailed Aug. 29, 2006 in Japanese Patent Application 2003-581064, filed Mar. 27, 2003.
Office Action mailed Jan. 26, 2007 in Chinese Patent Application 3807027.8, filed Mar. 28, 2003.
Office Action mailed Jul. 25, 2006 in Japanese Patent Application 2003-581063, filed Mar. 28, 2003.
Huang et al., "A syntax-directed translator with extended domain of locality," Jun. 9, 2006, In Proceedings of the Workshop on Computationally Hard Problems and Joint Inference in Speech and Language Processing, pp. 1-8, New York City, New York, Association for Computational Linguistics.
Melamed et al., "Statistical machine translation by generalized parsing," 2005, Technical Report 05-001, Proteus Project, New York University, http://nlp.cs.nyu.edu/pubs/.
Galley et al., "Scalable Inference and Training of Context-Rich Syntactic Translation Models," Jul. 2006, In Proceedings of the 21st International Conference on Computational Linguistics and 44th Annual Meeting of the ACL, pp. 961-968.
Huang et al., "Statistical syntax-directed translation with extended domain of locality," Jun. 9, 2006, In Proceedings of AMTA, pp. 1-8.
Zhang et al., "Synchronous Binarization for Machine Translations," Jun. 4-9, 2006, in Proc. of the Human Language Technology Conference of the North American Chapter of the ACL, pp. 256-263.

(56) References Cited

OTHER PUBLICATIONS

Zhang et al., "Distributed Language Modeling for N-best List Re-ranking," In Proceedings of the 2006 Conference on Empirical Methods in Natural Language Processing (Sydney, Australia, Jul. 22-23, 2006). ACL Workshops. Assoc. for Computational Linguistics, Morristown, NJ, 216-223.

"Patent Cooperation Treaty International Preliminary Report on Patentability and The Written Opinion, Internationalapplication No. PCT/US2008/004296, Oct. 6, 2009, 5 pgs."

Document, Wikipedia.com, web.archive.org (Feb. 24, 2004) <http://web.archive.org/web/20040222202831 /http://en.wikipedia.org/wikiiDocument>, Feb. 24, 2004.

Identifying, Dictionary.com, wayback.archive.org (Feb. 28, 2007) <http://wayback.archive.org/web/200501 01OOOOOO*/http:////dictionary.reference.com//browse//identifying>, Feb. 28, 2005 <http://web.archive.org/web/20070228150533/http://dictionary.reference.com/browse/identifying>.

Koehn, P. et al, "Statistical Phrase-Based Translation," Proceedings of HLT-NAACL 2003 Main Papers , pp. 48-54 Edmonton, May-Jun. 2003.

Abney, S.P., "Stochastic Attribute Value Grammars", Association for Computional Linguistics, 1997, pp. 597-618.

Fox, H., "Phrasal Cohesion and Statistical Machine Translation" Proceedings of the Conference on Empirical Methods in Natural Language Processing, Philadelphia, Jul. 2002, pp. 304-311. Association for Computational Linguistics. <URL: http://acl.ldc.upenn.edu/W/W02/W02-1039.pdf>.

Tillman, C., et al, "Word Reordering and a Dynamic Programming Beam Search Algorithm for Statistical Machine Translation," 2003, Association for Computational Linguistics, vol. 29, No. 1, pp. 97-133 <URL: http://acl.ldc.upenn.edu/J/J03/J03-1005.pdf>.

Wang, W., et al. "Capitalizing Machine Translation" In HLT-NAACL '06 Proceedings Jun. 2006. <http://www.isi.edu/natural-language/mt/hlt-naacl-06-wang.pdf>.

Langlais, P. et al., "TransType: a Computer-Aided Translation Typing System" EmbedMT '00 ANLP-NAACL 2000 Workshop: Embedded Machine Translation Systems, 2000, pp. 46-51. <http://acl.ldc.upenn.edu/W/W00/W00-0507.pdf>.

Abney, Steven P., "Parsing by Chunks," 1991, Principle-Based Parsing: Computation and Psycholinguistics, vol. 44, pp. 257-279.

Agbago, A., et al., "True-casing for the Portage System," In Recent Advances in Natural Language Processing (Borovets, Bulgaria), Sep. 21-23, 2005, pp. 21-24.

Al-Onaizan et al., "Statistical Machine Translation," 1999, JHU Summer Tech Workshop, Final Report, pp. 1-42.

Al-Onaizan et al., "Translating with Scarce Resources," 2000, 17th National Conference of the American Associationfor Artificial Intelligence, Austin, TX, pp. 672-678.

Al-Onaizan, Y. and Knight K., "Machine Transliteration of Names in Arabic Text," Proceedings of ACL Workshop on Computational Approaches to Semitic Languages. Philadelphia, 2002.

Al-Onaizan, Y. and Knight, K., "Named Entity Translation: Extended Abstract", 2002, Proceedings of HLT-02, SanDiego, CA.

Al-Onaizan, Y. and Knight, K., "Translating Named Entities Using Monolingual and Bilingual Resources," 2002, Proc. of the 40th Annual Meeting of the ACL, pp. 400-408.

Alshawi et al., "Learning Dependency Translation Models as Collections of Finite-State Head Transducers," 2000, Computational Linguistics, vol. 26, pp. 45-60.

Alshawi, Hiyan, "Head Automata for Speech Translation", Proceedings of the ICSLP 96, 1996, Philadelphia, Pennslyvania.

Ambati, V., "Dependency Structure Trees in Syntax Based Machine Translation," Spring 2008 Report <http://www.cs.cmu.edu/~vamshi/publications/DependencyMT_report.pdf>, pp. 1-8.

Arbabi et al., "Algorithms for Arabic name transliteration," Mar. 1994, IBM Journal of Research and Development, vol. 38, Issue 2, pp. 183-194.

Arun, A., et al., "Edinburgh System Description for the 2006 TC-STAR Spoken Language Translation Evaluation," in TC-STAR Workshop on Speech-to-Speech Translation (Barcelona, Spain), Jun. 2006, pp. 37-41.

Ballesteros, L. et al., "Phrasal Translation and Query Expansion Techniques for Cross-Language Information Retrieval," SIGIR 97, Philadelphia, PA, © 1997, pp. 84-91.

Bangalore, S. and Rambow, O., "Evaluation Metrics for Generation," 2000, Proc. of the 1st International NaturalLanguage Generation Conf., vol. 14, pp. 1-8.

Bangalore, S. and Rambow, O., "Using TAGs, a Tree Model, and a Language Model for Generation," May 2000, Workshop TAG+5, Paris.

Bangalore, S. and Rambow, O., "Corpus-Based Lexical Choice in Natural Language Generation," 2000, Proc. ofthe 38th Annual ACL, Hong Kong, pp. 464-471.

Bangalore, S. and Rambow, O., "Exploiting a Probabilistic Hierarchical Model for Generation," 2000, Proc. of 18thconf. on Computational Linguistics, vol. 1, pp. 42-48.

Bannard, C. and Callison-Burch, C., "Paraphrasing with Bilingual Parallel Corpora," In Proceedings of the 43rd Annual Meeting on Association for Computational Linguistics (Ann Arbor, MI, Jun. 25-30, 2005). Annual Meeting of the ACL Assoc. for Computational Linguistics, Morristown, NJ, 597-604. DOI=http://dx.doi.org/10.3115/1219840.

Barnett et al., "Knowledge and Natural Language Processing," Aug. 1990, Communications of the ACM, vol. 33, Issue 8, pp. 50-71.

Baum, Leonard, "An Inequality and Associated Maximization Technique in Statistical Estimation for ProbabilisticFunctions of Markov Processes", 1972, Inequalities 3:1-8.

Berhe, G. et al., "Modeling Service-based Multimedia Content Adaptation in Pervasive Computing," CF '04 (Ischia, Italy) Apr. 14-16, 2004, pp. 60-69.

Boitet, C. et al., "Main Research Issues in Building Web Services for Mutualized, Non-Commercial Translation," Proc. Of the 6th Symposium on Natural Language Processing, Human and Computer Processing of Language and Speech, © 2005, pp. 1-11.

Brants, Thorsten, "TnT—A Statistical Part-of-Speech Tagger," 2000, Proc. of the 6th Applied Natural LanguageProcessing Conference, Seattle.

Brill, Eric, "Transformation-Based Error-Driven Learning and Natural Language Processing: A Case Study in Part of Speech Tagging", 1995, Assocation for Computational Linguistics, vol. 21, No. 4, pp. 1-37.

Brill, Eric. "Transformation-Based Error-Driven Learning and Natural Language Processing: A Case Study in Partof Speech Tagging",1995, Computational Linguistics, vol. 21, No. 4, pp. 543-565.

Brown et al., "A Statistical Approach to Machine Translation," Jun. 1990, Computational Linguistics, vol. 16, No. 2, pp. 79-85.

Brown et al., "Word-Sense Disambiguation Using Statistical Methods," 1991, Proc. of 29th Annual ACL, pp. 264-270.

Brown et al., "The Mathematics of Statistical Machine Translation: Parameter Estimation," 1993, ComputationalLinguistics, vol. 19, Issue 2, pp. 263-311.

Brown, Ralf, "Automated Dictionary Extraction for "Knowledge-Free" Example-Based Translation," 1997, Proc. of 7th Int'l Cont. on Theoretical and Methodological Issues in MT, Santa Fe, NM, pp. 111-118.

Callan et al., "TREC and TIPSTER Experiments with INQUERY," 1994, Information Processing and Management, vol. 31, Issue 3, pp. 327-343.

Callison-Burch, C. et al., "Statistical Machine Translation with Word- and Sentence-aligned Parallel Corpora," In Proceedings of the 42nd Meeting on Assoc. for Computational Linguistics (Barcelona, Spain, Jul. 21-26, 2004). Annual Meeting of the ACL. Assoc. for Computational Linguistics, Morristown, NJ, 1.

Carl, Michael. "A Constructivist Approach to Machine Translation," 1998, New Methods of Language Processingand Computational Natural Language Learning, pp. 247-256.

Chen, K. and Chen, H., "Machine Translation: An Integrated Approach," 1995, Proc. of 6th Int'l Cont. on Theoreticaland Methodological Issue in MT, pp. 287-294.

(56) References Cited

OTHER PUBLICATIONS

Cheng, P. et al., "Creating Multilingual Translation Lexicons with Regional Variations Using Web Corpora," In Proceedings of the 42nd Annual Meeting on Assoc. for Computational Linguistics (Barcelona, Spain, Jul. 21-26, 2004). Annual Meeting of the ACL. Assoc. for Computational Linguistics, Morristown, NJ, 53.

Cheung et al., "Sentence Alignment in Parallel, Comparable, and Quasi-comparable Corpora", In Proceedings of LREC, 2004, pp. 30-33.

Chinchor, Nancy, "MUC-7 Named Entity Task Definition," 1997, Version 3.5.

Clarkson, P. and Rosenfeld, R., "Statistical Language Modeling Using the CMU-Cambridge Toolkit", 1997, Proc. ESCA Eurospeech, Rhodes, Greece, pp. 2707-2710.

Cohen et al., "Spectral Bloom Filters," SIGMOD 2003, Jun. 9-12, 2003, ACM pp. 241-252.

Cohen, "Hardware-Assisted Algorithm for Full-text Large-Dictionary String Matching Using n-gram Hashing," 1998, Information Processing and Management, vol. 34, No. 4, pp. 443-464.

Corston-Oliver, Simon, "Beyond String Matching and Cue Phrases: Improving Efficiency and Coverage inDiscourse Analysis", 1998, The AAAI Spring Symposium on Intelligent Text Summarization, pp. 9-15.

Covington, "An Algorithm to Align Words for Historical Comparison", Computational Linguistics, 1996, vol. 22, No. 4, pp. 481-496.

Dagan, I. and Itai, A., "Word Sense Disambiguation Using a Second Language Monolingual Corpus", 1994, Association forComputational Linguistics, vol. 20, No. 4, pp. 563-596.

Dempster et al., "Maximum Likelihood from Incomplete Data via the EM Algorithm", 1977, Journal of the RoyalStatistical Society, vol. 39, No. 1, pp. 1-38.

Diab, M. and Finch, S., "A Statistical Word-Level Translation Model for Comparable Corpora," 2000, In Proc.of theConference on Content Based Multimedia Information Access (RIAO).

Diab, Mona, "An Unsupervised Method for Multilingual Word Sense Tagging Using Parallel Corpora: APreliminary Investigation", 2000, SIGLEX Workshop on Word Senses and Multi-Linguality, pp. 1-9.

Eisner, Jason, "Learning Non-Isomorphic Tree Mappings for Machine Translation," 2003, in Proc. of the 41st Meeting of the ACL, pp. 205-208.

Elhadad et al., "Floating Constraints in Lexical Choice", 1996, ACL, vol. 23 No. 2, pp. 195-239.

Elhadad, M. and Robin, J., "An Overview of SURGE: a Reusable Comprehensive Syntactic RealizationComponent," 1996, Technical Report 96-03, Department of Mathematics and Computer Science, Ben GurionUniversity, Beer Sheva, Israel.

Elhadad, M. and Robin, J., "Controlling Content Realization with Functional Unification Grammars", 1992, Aspects of Automated Natural Language Generation, Dale et al. (eds)., Springer Verlag, pp. 89-104.

Koehn, P. and Knight, K., "Knowledge Sources for Word-Level Translation Models," 2001, Conference on EmpiricalMethods in Natural Language Processing.

Kumar, R. and Li, H., "Integer Programming Approach to Printed Circuit Board Assembly Time Optimization," 1995, IEEE Transactions on Components, Packaging, and Manufacturing, Part B: Advance Packaging, vol. 18, No. 4. pp. 720-727.

Kupiec, Julian, "An Algorithm for Finding Noun Phrase Correspondences in Bilingual Corpora," In Proceedings of the 31st Annual Meeting of the ACL, 1993, pp. 17-22.

Kurohashi, S. and Nagao, M., "Automatic Detection of Discourse Structure by Checking Surface Information inSentences," 1994, Proc. of COL-LING '94, vol. 2, pp. 1123-1127.

Langkilde, I. and Knight, K., "Generation that Exploits Corpus-Based Statistical Knowledge," 1998, Proc. of theCOLING-ACL, pp. 704-710.

Langkilde, I. and Knight, K., "The Practical Value of N-Grams in Generation," 1998, Proc. of the 9th InternationalNatural Language Generation Workshop, pp. 248-255.

Langkilde, Irene, "Forest-Based Statistical Sentence Generation," 2000, Proc. of the 1st Conference on NorthAmerican chapter of the ACL, Seattle, WA, pp. 170-177.

Langkilde-Geary, Irene, "A Foundation for General-Purpose Natural Language Generation: SentenceRealization Using Probabilistic Models of Language," 2002, Ph.D. Thesis, Faculty of the Graduate School, Universityof Southern California.

Langkilde-Geary, Irene, "An Empirical Verification of Coverage and Correctness for a General-PurposeSentence Generator," 1998, Proc. 2nd Int'l Natural Language Generation Conference.

Llitjos, A. F. et al., "The Translation Correction Tool: English-Spanish User Studies," Citeseer © 2004, downloaded from: http://gs37.sp.cs.cmu.edu/ari/papers/Irec04/fontll, pp. 1-4.

Mann, G. and Yarowsky, D., "Multipath Translation Lexicon Induction via Bridge Languages," 2001, Proc. of the2nd Conference of the North American Chapter of the ACL, Pittsburgh, PA, pp. 151-158.

Manning, C. and Schutze, H., "Foundations of Statistical Natural Language Processing," 2000, The MIT Press, Cambridge, MA [Front Matter].

Marcu, D. and Wong, W., "A Phrase-Based, Joint Probability Model for Statistical Machine Translation," 2002, Proc.of ACL-2 conference on Empirical Methods in Natural Language Processing, vol. 10, pp. 133-139.

Marcu, Daniel, "Building Up Rhetorical Structure Trees," 1996, Proc. of the National Conference on ArtificialIntelligence and Innovative Applications of Artificial Intelligence Conference, vol. 2, pp. 1069-1074.

Marcu, Daniel, "Discourse trees are good indicators of importance in text," 1999, Advances in Automatic TextSummarization, The MIT Press, Cambridge, MA.

Marcu, Daniel, "Instructions for Manually Annotating the Discourse Structures of Texts," 1999, DiscourseAnnotation, pp. 1-49.

Marcu, Daniel, "The Rhetorical Parsing of Natural Language Texts," 1997, Proceedings of ACLIEACL '97, pp. 96-103.

Marcu, Daniel, "The Rhetorical Parsing, Summarization, and Generation of Natural Language Texts," 1997, Ph. D.Thesis, Graduate Department of Computer Science, University of Toronto.

Marcu, Daniel, "Towards a Unified Approach to Memory- and Statistical-Based Machine Translation," 2001, Proc.of the 39th Annual Meeting of the ACL, pp. 378-385.

McCallum, A. and Li, W., "Early Results for Named Entity Recognition with Conditional Random Fields, Feature Induction and Web-enhanced Lexicons," In Proceedings of the Seventh Conference on Natural Language Learning at HLT-NAACL, 2003, vol. 4 (Edmonton, Canada), Assoc. for Computational Linguistics, Morristown, NJ, pp. 188-191.

McDevitt, K. et al., "Designing of a Community-based Translation Center," Technical Report TR-03-30, Computer Science, Virginia Tech, © 2003, pp. 1-8.

Melamed, I. Dan, "A Word-to-Word Model of Translational Equivalence," 1997, Proc. of the 35th Annual Meeting ofthe ACL, Madrid, Spain, pp. 490-497.

Melamed, I. Dan, "Automatic Evaluation and Uniform Filter Cascades for Inducing N-Best Translation Lexicons," 1995, Proc. of the 3rd Workshop on Very Large Corpora, Boston, MA, pp. 184-198.

Melamed, I. Dan, "Empirical Methods for Exploiting Parallel Texts," 2001, MIT Press, Cambridge, MA [table ofcontents].

Meng et al.. "Generating Phonetic Cognates to Handle Named Entities in English-Chinese Cross-LanguageSpoken Document Retrieval," 2001, IEEE Workshop on Automatic Speech Recognition and Understanding. pp. 311-314.

Metze, F. et al., "The NESPOLE! Speech-to-Speech Translation System," Proc. of the HLT 2002, 2nd Int'l. Conf. on Human Language Technology (San Francisco, CA), © 2002, pp. 378-383.

Mikheev et al., "Named Entity Recognition without Gazeteers," 1999, Proc. of European Chapter of the ACL, Bergen, Norway, pp. 1-8.

Miike et al., "A Full-Text Retrieval System with a Dynamic Abstract Generation Function," 1994, Proceedings of SI-GIR'94, pp. 152-161.

Mohri, M. And Riley, M., "An Efficient Algorithm for the N-Best-Strings Problem," 2002, Proc. of the 7th Int. Conf. onSpoken Language Processing (ICSLP'02), Denver, CO, pp. 1313-1316.

(56) References Cited

OTHER PUBLICATIONS

Mohri, Mehryar, "Regular Approximation of Context Free Grammars Through Transformation", 2000, pp. 251-261, "Robustness in Language and Speech Technology", Chapter 9, Kluwer Academic Publishers.
Monasson et al., "Determining Computational Complexity from Characteristic 'Phase Transitions'," Jul. 1999, NatureMagazine, vol. 400, pp. 133-137.
Mooney, Raymond, "Comparative Experiments on Disambiguating Word Senses: An Illustration of the Role of Biasin Machine Learning," 1996, Proc. of the Conference on Empirical Methods in Natural Language Processing, pp. 82-91.
Nagao, K. et al., "Semantic Annotation and Transcoding: Making Web Content More Accessible," IEEE Multimedia, vol. 8, Issue 2 Apr.-Jun. 2001, pp. 69-81.
Nederhof, M. and Satta, G., "IDL-Expressions: A Formalism for Representing and Parsing Finite Languages inNatural Language Processing," 2004, Journal of Artificial Intelligence Research, vol. 21, pp. 281-287.
Nieben, S. and Ney, H, "Toward Hierarchical Models for Statistical Machine Translation of Inflected Languages," 2001, Data-Driven Machine Translation Workshop, Toulouse, France, pp. 47-54.
Norvig, Peter, "Techniques for Automatic Memoization with Applications to Context-Free Parsing", Computational Linguistics, 1991, pp. 91-98, vol. 17, No. 1.
Och et al., "Improved Alignment Models for Statistical Machine Translation," 1999, Proc. of the Joint Conf. ofEmpirical Methods in Natural Language Processing and Very Large Corpora, pp. 20-28.
Och et al. "A Smorgasbord of Features for Statistical Machine Translation." HLTNAACL Conference. Mar. 2004, 8 pages.
Och, F., "Minimum Error Rate Training in Statistical Machine Translation," In Proceedings of the 41st Annual Meeting on Assoc. for Computational Linguistics—vol. 1 (Sapporo, Japan, Jul. 7-12, 2003). Annual Meeting of the ACL. Assoc. for Computational Linguistics, Morristown, NJ, 160-167. DOI= http://dx.doi.org/10.3115/1075096.
Och, F. and Ney, H, "Improved Statistical Alignment Models," 2000, 38th Annual Meeting of the ACL, Hong Kong, pp. 440-447.
Och, F. and Ney, H., "Discriminative Training and Maximum Entropy Models for Statistical Machine Translation," 2002, Proc. of the 40th Annual Meeting of the ACL, Philadelphia, PA, pp. 295-302.
Och, F. and Ney, H., "A Systematic Comparison of Various Statistical Alignment Models," Computational Linguistics, 2003, 29:1, 19-51.
Papineni et al., "Bleu: a Method for Automatic Evaluation of Machine Translation," 2001, IBM Research Report, RC22176(WQ102-022).
Perugini, Saviero et al., "Enhancing Usability in CITIDEL: Multimodal, Multilingual and Interactive Visualization Interfaces," JCDL '04, Tucson, AZ, Jun. 7-11, 2004, pp. 315-324.
Petrov et al., "Learning Accurate, Compact and Interpretable Tree Annotation," Jun. 4-9, 2006, in Proc. of the Human Language Technology Conference of the North American Chapter of the ACL, pp. 433-440.
Pla et al., "Tagging and Chunking with Bigrams," 2000, Proc. of the 18th Conference on Computational Linguistics, vol. 2, pp. 614-620.
Qun, Liu, "A Chinese-English Machine Translation System Based on Micro-Engine Architecture," An Int'l Conference on Translation and Information Technology, Hong Kong, Dec. 2000, pp. 1-10.
Rapp, Reinhard, Automatic Identification of Word Translations from Unrelated English and German Corpora, 1999, 37th Annual Meeting of the ACL, pp. 519-526.
Rapp, Reinhard, "Identifying Word Translations in Non-Parallel Texts," 1995, 33rd Annual Meeting of the ACL, pp. 320-322.
Resnik, P. and Smith, A., "The Web as a Parallel Corpus," Sep. 2003, Computational Linguistics, SpecialIssue on Web as Corpus, vol. 29, Issue 3, pp. 349-380.
Resnik, P. and Yarowsky, D. "A Perspective on Word Sense Disambiguation Methods and Their Evaluation," 1997, Proceedings of SIGLEX '97, Washington, D.C., pp. 79-86.
Resnik, Philip, "Mining the Web for Bilingual Text," 1999, 37th Annual Meeting of the ACL, College Park, MD, pp. 527-534.
Rich, E. and Knight, K., "Artificial Intelligence, Second Edition," 1991, McGraw-Hill Book Company [Front Matter].
Richard et al., "Visiting the Traveling Salesman Problem with Petri nets and application in the glass industry," Feb. 1996, IEEE Emerging Technologies and Factory Automation, pp. 238-242.
Robin, Jacques, "Revision-Based Generation of Natural Language Summaries Providing Historical Background: Corpus-Based Analysis, Design Implementation and Evaluation," 1994, Ph.D. Thesis, Columbia University, New York.
Rogati et al., "Resource Selection for Domain-Specific Cross-Lingual IR," ACM 2004, pp. 154-161.
Zhang, R. et al., "The NiCT-ATR Statistical Machine Translation System for the IWSLT 2006 Evaluation," submitted to IWSLT, 2006.
Russell, S. and Norvig, P., "Artificial Intelligence: A Modern Approach," 1995, Prentice-Hall, Inc., New Jersey [Front Matter].
Sang, E. and Buchholz, S., "Introduction to the CoNLL-2000 Shared Task: Chunking," 2002, Proc. ofCoNLL-2000 and LLL-2000, Lisbon, Portugal, pp. 127-132.
Schmid, H., and Schulte im Walde, S., "Robust German Noun Chunking With a Probabilistic Context-Free Grammar," 2000, Proc. of the 18th Conference on Computational Linguistics, vol. 2, pp. 726-732.
Schutze, Hinrich, "Automatic Word Sense Discrimination," 1998, Computational Linguistics, Special Issue on WordSense Disambiguation, vol. 24, Issue 1, pp. 97-123.
Selman et al., "A New Method for Solving Hard Satisfiability Problems," 1992, Proc. of the 10th National Conferenceon Artificial Intelligence, San Jose, CA, pp. 440-446.
Kumar, S. and Byrne, W., "Minimum Bayes-Risk Decoding for Statistical Machine Translation." HLTNAACL Conference. Mar. 2004, 8 pages.
Shapiro, Stuart (ed.), "Encyclopedia of Artificial Intelligence, 2nd edition", vol. D 2,1992, John Wiley & Sons Inc;"Unification" article, K. Knight, pp. 1630-1637.
Sobashima et al., "A Bidirectional Transfer-Driven Machine Translation System for Spoken Dialogues," 1994, Proc.of 15th Conference on Computational Linguistics, vol. 1, pp. 64-68.
Soricut et al., "Using a Large Monolingual Corpus to Improve Translation Accuracy," 2002, Lecture Notes In Computer Science, vol. 2499, Proc. of the 5th Conference of the Association for Machine Translation in theAmericas on Machine Translation: From Research to Real Users, pp. 155-164.
Stalls, B. and Knight, K., "Translating Names and Technical Terms in Arabic Text," 1998, Proc. of the COLING/ACL Workkshop on Computational Approaches to Semitic Language.
Sumita et al., "A Discourse Structure Analyzer for Japanese Text," 1992, Proc. of the International Conference onFifth Generation Computer Systems, vol. 2, pp. 1133-1140.
Sun et al., "Chinese Named Entity Identification Using Class-based Language Model," 2002, Proc. of 19thInternational Conference on Computational Linguistics, Taipei, Taiwan, vol. 1, pp. 1-7.
Tanaka, K. and Iwasaki, H. "Extraction of Lexical Translations from Non-Aligned Corpora," Proceedings of COLING 1996.
Taskar, B., et al., "A Discriminative Matching Approach to Word Alignment," In Proceedings of the Conference on Human Language Technology and Empirical Methods in Natural Language Processing (Vancouver, BC, Canada, Oct. 6-8, 2005). Human Language Technology Conference. Assoc. for Computational Linguistics, Morristown, NJ.
Taylor et al., "The Penn Treebank: An Overview," in A. Abeill (ed.), D Treebanks: Building and Using ParsedCorpora, 2003, pp. 5-22.
Tiedemann, Jorg, "Automatic Construction of Weighted String Similarity Measures," 1999, In Proceedings ofthe Joint SIGDAT Conference on Emperical Methods in Natural Language Processing and Very Large Corpora.
Tillman, C. and Xia, F., "A Phrase-Based Unigram Model for Statistical Machine Translation," 2003, Proc. of theNorth American Chapter of the ACL on Human Language Technology, vol. 2, pp. 106-108.
Tillmann et al., "A DP Based Search Using Monotone Alignments in Statistical Translation," 1997, Proc. of theAnnual Meeting of the ACL, pp. 366-372.

(56) References Cited

OTHER PUBLICATIONS

Tomas, J., "Binary Feature Classification for Word Disambiguation in Statistical Machine Translation," Proceedings of the 2nd Int'l. Workshop on Pattern Recognition, 2002, pp. 1-12.
Uchimoto, K. et al., "Word Translation by Combining Example-Based Methods and Machine Learning Models," Natural LanguageProcessing (Shizen Gengo Shori), vol. 10, No. 3, Apr. 2003, pp. 87-114.
Uchimoto, K. et al., "Word Translation by Combining Example-based Methods and Machine Learning Models," Natural LanguageProcessing (Shizen Gengo Shori), vol. 10, No. 3, Apr. 2003, pp. 87-114. (English Translation).
Ueffing et al., "Generation of Word Graphs in Statistical Machine Translation," 2002, Proc. of Empirical Methods inNatural Language Processing (EMNLP), pp. 156-163.
Varga et al., "Parallel Corpora for Medium Density Languages", In Proceedings of RANLP 2005, pp. 590-596.
Veale, T. and Way, A., "Gaijin: A Bootstrapping, Template-Driven Approach to Example-Based MT," 1997, Proc. ofNew Methods in Natural Language Processing (NEMPLP97), Sofia, Bulgaria.
Vogel et al., "The CMU Statistical Machine Translation System," 2003, Machine Translation Summit IX, New Orleans, LA.
Vogel et al., "The Statistical Translation Module in the Verbmobil System," 2000, Workshop on Multi-Lingual SpeechCommunication, pp. 69-74.
Vogel, S. and Ney, H., "Construction of a Hierarchical Translation Memory," 2000, Proc. of Cooling 2000, Saarbrucken, Germany, pp. 1131-1135.
Wang, Y. and Waibel, A., "Decoding Algorithm in Statistical Machine Translation," 1996, Proc. of the 35th AnnualMeeting of the ACL, pp. 366-372.
Wang, Ye-Yi, "Grammar Inference and Statistical Machine Translation," 1998, Ph.D Thesis, Carnegie MellonUniversity, Pittsburgh, PA.
Watanabe et al., "Statistical Machine Translation Based on Hierarchical Phrase Alignment," 2002, 9th InternationalConference on Theoretical and Methodological Issues in Machin Translation (TMI-2002), Keihanna, Japan, pp. 188-198.
Witbrock, M. and Mittal, V., "Ultra-Summarization: A Statistical Approach to Generating Highly Condensed Non-Extractive Summaries," 1999, Proc. of SIGIR '99, 22nd International Conference on Research and Development inInformation Retrieval, Berkeley, CA, pp. 315-316.
Wu, Dekai, "A Polynomial-Time Algorithm for Statistical Machine Translation," 1996, Proc. of 34th Annual Meeting ofthe ACL, pp. 152-158.
Wu, Dekai, "Stochastic Inversion Transduction Grammars and Bilingual Parsing of Parallel Corpora," 1997, Computational Linguistics, vol. 23, Issue 3, pp. 377-403.
Yamada, K. and Knight, K. "A Syntax-Based Statistical Translation Model," 2001, Proc. of the 39th AnnualMeeting of the ACL, pp. 523-530.
Yamada, K. and Knight, K., "A Decoder for Syntax-Based Statistical MT," 2001, Proceedings of the 40th AnnualMeeting of the ACL, pp. 303-310.
Yamada K., "A Syntax-Based Statistical Translation Model," 2002 PhD Dissertation, pp. 1-141.
Yamamoto et al., "A Comparative Study on Translation Units for Bilingual Lexicon Extraction," 2001, JapanAcademic Association for Copyright Clearance, Tokyo, Japan.
Yamamoto et al, "Acquisition of Phrase-level Bilingual Correspondence using Dependency Structure" In Proceedings of COLING-2000, pp. 933-939.
Yarowsky, David, "Unsupervised Word Sense Disambiguation Rivaling Supervised Methods," 1995, 33rd AnnualMeeting of the ACL, pp. 189-196.
Elhadad, Michael, "FUF: the Universal Unifier User Manual Version 5.2", 1993, Department of Computer Science,Ben Gurion University, Beer Sheva, Israel.
Elhadad, Michael, "Using Argumentation to Control Lexical Choice: A Functional Unification Implementation",1992, Ph.D. Thesis, Graduate School of Arts and Sciences, Columbia University.
Elhadad, M. and Robin, J., "SURGE: a Comprehensive Plug-in Syntactic Realization Component for TextGeneration", 1999 (available at http://www.cs.bgu.ac.il/-elhadad/pub.html).
Fleming, Michael et al., "Mixed-Initiative Translation of Web Pages,"AMTA 2000, LNAI 1934, Springer-Verlag, Berlin, Germany, 2000, pp. 25-29.
Och, Franz Josef and Ney, Hermann, "Improved Statistical Alignment Models" ACLOO:Proc. of the 38th Annual Meeting of the Association for Computational Lingustics, 'Online! Oct. 2-6, 2000, pp. 440-447, XP002279144 Hong Kong, China Retrieved from the Internet: <URL:http://www-i6.informatik.rwth-aachen.de/Colleagues/och/ACLOO.ps> retrieved on May 6, 2004! abstract.
Ren, Fuji and Shi, Hongchi, "Parallel Machine Translation: Principles and Practice," Engineering of Complex Computer Systems, 2001 Proceedings, Seventh IEEE Int'l. Conference, pp. 249-259, 2001.
Fung et al, "Mining Very-Non-Parallel Corpora: Parallel Sentence and Lexicon Extraction via Bootstrapping and EM", In EMNLP 2004.
Fung, P. and Yee, L., "An IR Approach for Translating New Words from Nonparallel, Comparable Texts", 1998, 36th Annual Meeting of the ACL, 17th International Conference on Computational Linguistics, pp. 414-420.
Fung, Pascale, "Compiling Bilingual Lexicon Entries From a Non-Parallel English-Chinese Corpus", 1995, Proc, ofthe Third Workshop on Very Large Corpora, Boston, MA, pp. 173-183.
Gale, W. and Church, K., "A Program for Aligning Sentences in Bilingual Corpora," 1991, 29th Annual Meeting ofthe ACL, pp. 177-183.
Gale, W. and Church, K., "A Program for Aligning Sentences in Bilingual Corpora," 1993, Computational Linguisitcs, vol. 19, No. 1, pp. 75-102.
Galley et al., "Scalable Inference and Training of Context-Rich Syntactic Translation Models," Jul. 2006, in Proc. Of the 21st International Conference on Computational Linguistics, pp. 961-968.
Galley et al., "What's in a translation rule?", 2004, in Proc. Of HLT/NAACL '04, pp. 1-8.
Gaussier et al, "A Geometric View on Bilingual Lexicon Extraction from Comparable Corpora", In Proceedings of ACL 2004, July.
Germann et al., "Fast Decoding and Optimal Decoding for Machine Translation", 2001, Proc. of the 39th AnnualMeeting of the ACL, Toulouse, France, pp. 228-235.
Germann, Ulrich: "Building a Statistical Machine Translation System from Scratch: How Much Bang for theBuck Can We Expect?" Proc. Of the Data-Driven MT Workshop of ACL-01, Toulouse, France, 2001.
Gildea, D., "Loosely Tree-based Alignment for Machine Translation," In Proceedings of the 41st Annual Meeting on Assoc. for Computational Linguistics—vol. 1 (Sapporo, Japan, Jul. 7-12, 2003). Annual Meeting of the ACL Assoc. for Computational Linguistics, Morristown, NJ, 80-87. DOI=http://dx.doi.org/10.3115/1075096.1075107.
Grefenstette, Gregory, "The World Wide Web as a Resource for Example-Based Machine TranslationTasks", 1999, Translating and the Computer 21, Proc. of the 21 st International Cant. on Translating and theComputer. London, UK, 12 pp.
Grossi et al, "Suffix Trees and Their Applications in String Algorithms", In. Proceedings of the 1st South American Workshop on String Processing, Sep. 1993, pp. 57-76.
Gupta et al., "Kelips: Building an Efficient and Stable P2P DHT thorough Increased Memory and Background Overhead," 2003 IPTPS, LNCS 2735, pp. 160-169.
Habash, Nizar, "The Use of a Structural N-gram Language Model in Generation-Heavy Hybrid Machine Translation," University of Maryland, Univ. Institute for Advance Computer Studies, Sep. 8, 2004.
Hatzivassiloglou, V. et al., "Unification-Based Glossing", 1995, Proc. of the International Joint Conference onArtificial Intelligence, pp. 1382-1389.

(56) References Cited

OTHER PUBLICATIONS

Huang et al., "Relabeling Syntax Trees to Improve Syntax-Based Machine Translation Quality," Jun. 4-9, 2006, in Proc. of the Human Language Techology Conference of the North Americna Chapter of the ACL, pp. 240-247.

Ide, N. and Veronis, J., "Introduction to the Special Issue on Word Sense Disambiguation: The State of the Art", Mar. 1998, Computational Linguistics, vol. 24, Issue 1, pp. 2-40.

Bikel, D., Schwartz, R., and Weischedei, R., "An Algorithm that Learns What's in a Name," Machine Learning 34, 211-231 (1999).

Imamura et al., "Feedback Cleaning of Machine Translation Rules Using Automatic Evaluation," 2003 Computational Linguistics, pp. 447-454.

Imamura, Kenji, "Hierarchical Phrase Alignment Harmonized with Parsing", 2001, in Proc. of NLPRS, Tokyo.

Jelinek, F., "ast Sequential Decoding Algorithm Using a Stack", Nov. 1969, IBM J. Res. Develop., vol. 13, No. 6, pp. 675-685.

Jones, K. Sparck, "Experiments in Relevance Weighting of Search Terms", 1979, Information Processing &Management, vol. 15, Pergamon Press Ltd., UK, pp. 133-144.

Klein et al., "Accurate Unlexicalized Parsing," Jul. 2003, in Proc. of the 41st Annual Meeting of the ACL, pp. 423-430.

Knight et al., "Integrating Knowledge Bases and Statistics in MT," 1994, Proc. of the Conference of the Associationfor Machine Translation in the Americas.

Knight et al., "Filling Knowledge Gaps in a Broad-Coverage Machine Translation System", 1995, Proc. ofthe14th International Joint Conference on Artificial Intelligence, Montreal, Canada, vol. 2, pp. 1390-1396.

Knight, K. and Al-Onaizan, Y., "A Primer on Finite-State Software for Natural Language Processing", 1999 (available at http://www.isLedullicensed-sw/carmel).

Knight, K. and Al-Onaizan, Y., "Translation with Finite-State Devices," Proceedings of the 4th AMTA Conference, 1998.

Knight, K. and Chander, I., "Automated Postediting of Documents," 1994, Proc. of the 12th Conference on ArtificialIntelligence, pp. 779-784.

Knight, K. and Graehl, J., "Machine Transliteration", 1997, Proc. of the ACL-97, Madrid, Spain, pp. 128-135.

Knight, K. and Hatzivassiloglou, V., "Two-Level, Many-Paths Generation," 1995, Proc. of the 33rd AnnualConference of the ACL, pp. 252-260.

Knight, K. and Luk, S., "Building a Large-Scale Knowledge Base for Machine Translation," 1994, Proc. of the 12thConference on Artificial Intelligence, pp. 773-778.

Knight, K. and Marcu, D., "Statistics-Based Summarization—Step One: Sentence Compression," 2000, AmericanAssociation for Artificial Intelligence Conference, pp. 703-710.

Knight, K. and Yamada, K., "A Computational Approach to Deciphering Unknown Scripts," 1999, Proc. of the ACLWorkshop on Unsupervised Learning in Natural Language Processing.

Knight, Kevin, "A Statistical MT Tutorial Workbook," 1999, JHU Summer Workshop (available at http://www.isLedu/natural-language/mUwkbk.rtf).

Knight, Kevin, "Automating Knowledge Acquisition for Machine Translation," 1997, AI Magazine, vol. 18, No. 4.

Knight, Kevin, "Connectionist Ideas and Algorithms," Nov. 1990, Communications of the ACM, vol. 33, No. 11, pp. 59-74.

Knight, Kevin, "Decoding Complexity in Word-Replacement Translation Models", 1999, Computational Linguistics, vol. 25, No. 4.

Knight, Kevin, "Integrating Knowledge Acquisition and Language Acquisition", May 1992, Journal of AppliedIntelligence, vol. 1, No. 4.

Knight, Kevin, "Learning Word Meanings by Instruction," 1996, Proc. of the D National Conference on ArtificialIntelligence, vol. 1, pp. 447-454.

Knight, Kevin, "Unification: A Multidisciplinary Survey," 1989, ACM Computing Surveys, vol. 21, No. 1.

Koehn, Philipp, "Noun Phrase Translation," A PhD Dissertation for the University of Southern California, pp. xiii, 23, 25-57, 72-81, Dec. 2003.

Koehn, P. and Knight, K., "ChunkMT: Statistical Machine Translation with Richer Linguistic Knowledge," Apr. 2002, Information Sciences Institution.

Koehn, P. and Knight, K., "Estimating Word Translation Probabilities from Unrelated Monolingual Corpora Usingthe EM Algorithm," 2000, Proc. of the 17th meeting of the AAAI.

Yossi, Cohen "Interpreter for FUF," (available at ftp:/lftp.cs.bgu.ac.il/ pUb/people/elhadad/fuf-life.lf) (downloaded Jun. 1, 2008).

Lee, Yue-Shi, "Neural Network Approach to Adaptive Learning: with an Application to Chinese Homophone Disambiguation," IEEE 2001 pp. 1521-1526.

Lita, L., et al., "tRuEcasIng," 2003 Proceedings of the 41st Annual Meeting of the Assoc. for Computational Linguistics (in Hinrichs, E. And Roth, D.-editors), pp. 152-159.

Rayner et al., " Hybrid Language Processing in the Spoken Language Translator," IEEE 1997, pp. 107-110.

Shirai, S., "A Hybrid Rule and Example-based Method for Machine Translation," 1997, NTT Communication Science Laboratories, pp. 1-5.

Notice of Allowance mailed Dec. 10, 2013 in Japanese Patent Application 2007-536911, filed Oct. 12, 2005.

\* cited by examiner

SYSTEMS AND METHODS FOR TUNING PARAMETERS IN STATISTICAL MACHINE TRANSLATION

TECHNICAL FIELD

This application relates generally to methods and systems for language translation and, more specifically, to systems and methods for tuning translation parameters in a statistical machine translation system based on a ranking of translation parameters.

BACKGROUND

The approaches described in this section could be pursued but are not necessarily approaches that have been previously conceived or pursued. Therefore, unless otherwise indicated, it should not be assumed that any of the approaches described in this section constitute prior art merely by virtue of their inclusion in this section.

Machine translation (MT), which is also known as computer-aided translation, is a rapidly growing field. It involves the use of computer software to automatically translate one natural language into another. MT takes into account the grammatical structure of a language and uses contextual rules to select among multiple meanings in order to translate sentences from a source language (to be translated) into a target language (translated). MT can be used to translate language within a variety of media such as speech, text, audio/video, web pages and so forth.

Statistical MT attempts to generate translations using statistical methods with parameters derived from the analysis of bilingual text corpora such as the Canadian Hansard corpus, the English-French record of the Canadian Parliament, or EUROPARL, records of the European Parliament, and the like. The idea behind statistical machine translation comes from information theory. Sentences are translated according to a probability distribution p(e|f) so that the string e in the target language (e.g., English) is the translation of a string f in the source language (e.g., French).

Statistical systems, may be based on the Noisy Channel Model initially developed by Claude Shannon in 1948, and generally can be interpreted as:

$$\hat{e} = \underset{e}{\operatorname{argmax}} p(e \mid f) = \underset{e}{\operatorname{argmax}} p(f \mid e) p(e) \qquad \text{Eq. 1}$$

where the translation model p(f|e) is the probability that the source string is the translation of the target string, and the language model p(e) is the probability of seeing that target language string. Without going into the details, this approach states that the best translation ê (English) of a sentence f (foreign) is the sentence e that maximizes p(e|f). For a rigorous implementation of this approach, one would have to perform an exhaustive search by going through all strings e in the source language. Thus, the statistical MT models require training to optimize their parameters in order to achieve the highest translation results.

SUMMARY

In accordance with various embodiments and the corresponding disclosure thereof, systems and methods for statistical MT parameter tuning based on ranking translation parameters are provided. Unlike the popular Minimum Error Rate Training (MERT) and Margin Infused Relaxed Algorithm (MIRA) techniques, the present disclosure provides a simpler approach to tuning that scales well to high-dimensional feature spaces. According to the various embodiments disclosed herein, a tuning process is cast as a ranking problem, wherein the explicit goal is to learn to correctly rank candidate translation units. The ranking problem can be resolved using linear binary classification of candidate translation unit pairs (in other words, pair-wise ranking). This technique can be built on top of any MERT framework, which is why this technique can be easily adopted to existing MT software.

In one example embodiment, a computer-implemented method for statistical machine translation parameter tuning is provided. The method may comprise sampling pairs of candidate translation units from a set of candidate translation units corresponding to a source unit, with each candidate translation unit corresponding to numeric values assigned to one or more features, receiving an initial weighting value for each feature, comparing the pairs of candidate translation units to produce binary results, and using the binary results to adjust the initial weighting values to produce modified weighting values.

The method may further comprise calculating Bilingual Evaluation Understudy (BLEU) scores for each candidate translation unit and determining scoring functions for the candidate translation units. The ranking of translation parameters can be based on the ranking of the results of scoring functions for each pair of candidate translation units. The method may further comprise sampling one or more candidate translation units. The ranking may be applied to the translation parameters of the sampled candidate translation units. The sampling may comprise generating a plurality of candidate translation unit pairs, assigning a probability coefficient to each candidate translation unit pair, and selecting the candidate translation unit pairs having the highest score differential. The source units and the candidate translation units may comprise words, phrases, and sentences. The generating of the set of candidate translation units may comprise selecting one or more candidate translation units from a translation database. The translation parameters associated with the set of candidate translation units may comprise a candidate translation space policy, a scoring function, a BLEU score, a weight vector, and a loss function. The translation parameters may be ranked such that those candidate translation units having higher relevancy for correct translation of the source units are associated with the minimized loss function, the highest weight vector, or the best candidate translation space policy. The ranking may comprise pair-wise ranking, linear binary classification, logistic regression classification, maximum entropy classification, and iterative classification.

In yet another embodiment, a system for statistical machine translation parameter tuning may be provided. The system may comprise one or more processors configured to receive one or more source units to be translated, generate a set of candidate translation units for each source unit, determine translation parameters associated with the set of candidate translation units, rank the translation parameters, and tune the translation parameters based on the results of ranking. The system may further comprise a memory coupled to the processors, with the memory comprising code for the processors.

The processors may be further configured to calculate BLEU (Bilingual Evaluation Understudy) scores for each candidate translation unit and determine scoring functions for the candidate translation units. The ranking of translation parameters may be based on the ranking of the results of scoring functions for each pair of candidate translation units.

The processors can be further configured to sample one or more candidate translation units. The rank may be applied to the translation parameters of the set of candidate translation units. The source unit and candidate translation units may comprise words, phrases, and sentences. The generating of the set of candidate translation units may comprise selecting one or more candidate translation units from a translation database.

The translation parameters associated with the set of candidate translation units, may comprise a candidate translation space policy, a scoring function, a BLEU score, a weight vector, and a loss function. The translation parameters may be ranked such that those candidate translation units having higher relevancy for correct translation of the source units are associated with the minimized loss function, the highest weight vector, and the best candidate translation space policy. The ranking may comprise pair-wise ranking, linear binary classification, logistic regression classification, maximum entropy classification, and iterative classification.

In yet another embodiment, a computer-readable medium having instructions stored thereon is provided. The instructions, when executed by one or more computers, may cause the one or more computers to receive one or more source units to be translated, generate a set of candidate translation units for each source unit, determine translation parameters associated with the candidate translation units, rank the translation parameters for the set of candidate translation units, and tune the translation parameters based on the results of the ranking.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

Embodiments are illustrated by way of example and not limitation in the figures of the accompanying drawings, in which like references indicate similar elements and in which.

DETAILED DESCRIPTION

Figure 1:
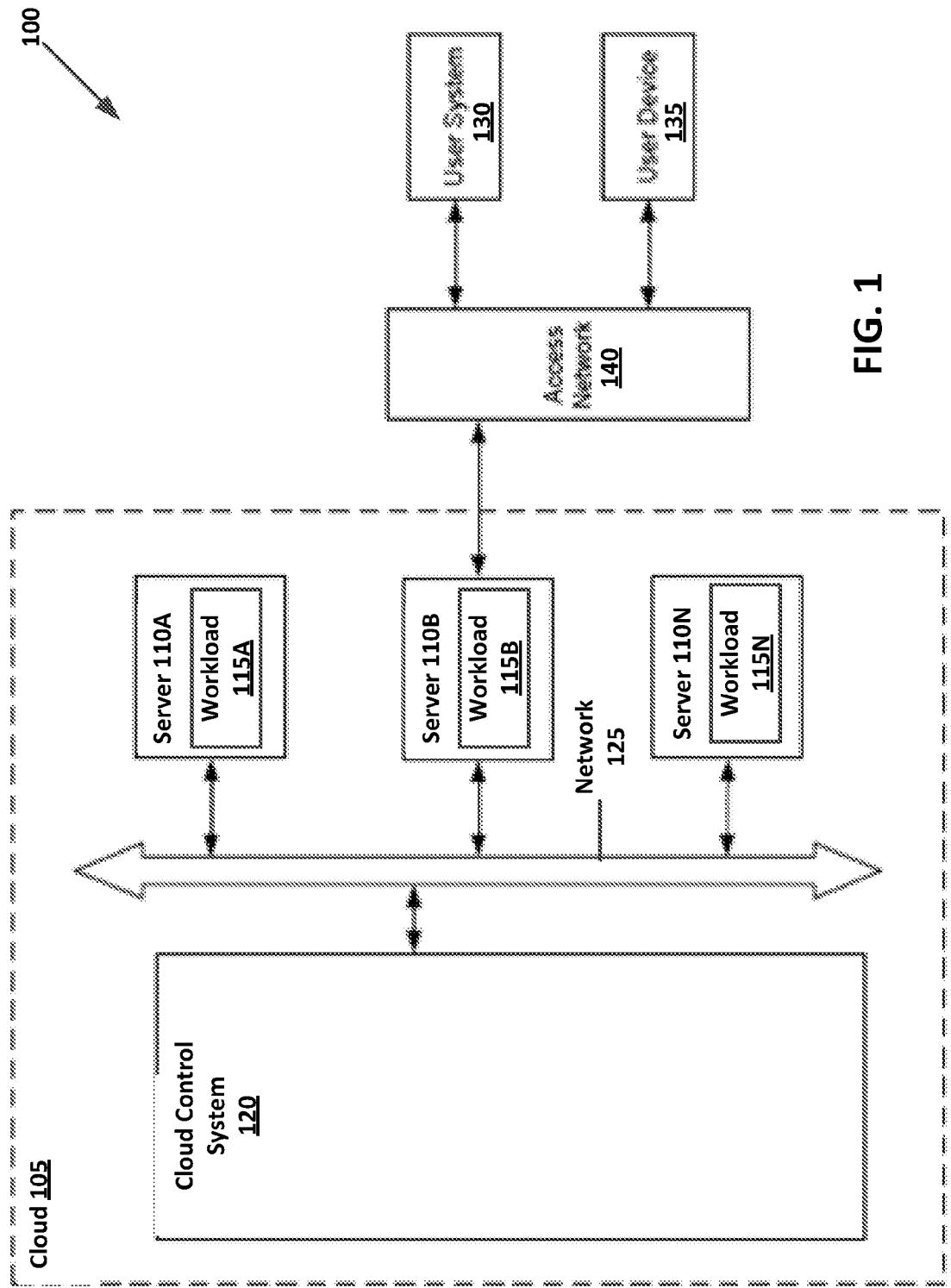
FIG. 1 illustrates an exemplary cloud system for practicing aspects of the present technology.

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical and electrical changes can be made without departing from the scope of what is claimed. The following detailed description is, therefore, not to be taken in a limiting sense, and the scope is defined by the appended claims and their equivalents.

In this document, the terms "a" or "an" are used, as is common in patent documents, to include one or more than one. In this document, the term "or" is used to refer to a nonexclusive "or", such that "A or B" includes "A but not B", "B but not A", and "A and B", unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

MERT is currently the most popular way to tune the parameters of statistical machine translation systems. MERT is well-understood, easy to implement, and executes rapidly, but can have erratic behavior and does not scale well beyond a handful of features. This lack of scalability is a significant weakness, as it inhibits systems from using more than a couple dozen features to discriminate between candidate translations and stymies feature development innovation.

Several researchers have attempted to address this weakness. Recently, a new technique was developed using MIRA. This technique has been shown to perform well on large-scale tasks with hundreds or thousands of features. However, the technique is complex and architecturally different from MERT, making it difficult to use in MT software.

In accordance with various embodiments and the corresponding disclosure thereof, systems and methods for statistical MT parameter tuning are provided. Tuning the parameters of statistical MT techniques may improve quality, reliability and effectiveness of translation. To tune MT parameters, source language units (e.g., words, phrases, and sentences) may be initially processed. A computing system for statistical MT parameter tuning may receive translation source units to be translated and generate sets of candidate translation units for each source unit. Conventionally, this approach is used to generate a candidate pool and is based on selection of candidate translation units from a translation database.

Furthermore, the system may determine one or more translation parameters associated with the candidate translation units. Such parameters may refer, among other things, to scoring functions, weight vectors, and loss functions. This technique may be used to optimize one or more of these translation parameters such that the most relevant or correct candidate translation units are selected from the candidate pool, thereby improving overall translation quality. The optimization process may be based on pair-wise ranking of the candidate translation units. Specifically, a linear binary classification method may be applied to sort candidate translation units, and iteratively reveal those parameters which have the highest weight factors, minimized loss function results, and the like. The result of the ranking may then be used to tune one or more translation parameters. For example, the ranking results may allow selecting a more reliable weight factor, which may be applied to various candidate translation units. The ranking and tuning process may be implemented iteratively, and therefore the MT technique may be trained to provide optimized translation quality. Considering that the technique may handle millions of features, a sampling procedure may be applied before the optimization process to perform fast ranking. As a result, the present technique may be used to tune parameters of statistical MT models and improve quality, reliability and effectiveness of translation.

The embodiments described herein may be implemented by various means, depending on the application. For example, the embodiments may be implemented in hardware, firmware, software, or a combination thereof. For hardware implementation, the embodiments may be implemented with processors, controllers, micro-controllers, microprocessors, electronic devices, other electronic units designed to perform the functions described herein, or a combination thereof. Memory can be implemented within a processor or be external to the processor. As used herein, the term "memory" refers to any type of long term, short term, volatile, nonvolatile, or other storage device and is not to be limited to any particular type of memory or number of memories, or type of media upon which memory is stored. For firmware and/or software implementation, the embodiments may be implemented with modules such as procedures and functions described herein. Any machine-readable medium tangibly embodying instructions may be used in implementing the embodiments described herein.

Referring now to the drawings, FIG. 1 illustrates an exemplary cloud system 100 for practicing aspects of the present technology. The system 100 is shown as including a "data center" or cloud 105 including servers 110A, 110B, and 110N (cloud 105 may include any number of servers), and a cloud control system 120 according to one embodiment. Cloud control system 120 manages the hardware resources (e.g., processor, memory, and/or storage space) of servers 110A-N coupled by network 125 (e.g., a local-area or other data network) or otherwise.

Users of cloud 105 may access the services of the cloud 105 via a user system 130 (e.g., a website server) or user device 135 (e.g., a phone or PDA) running an application program interface (API). User system 130 and user device 135 communicatively couple to the cloud 105 using an access network 140 (e.g., the Internet or other telecommunications network). Access network 140 may communicate, for example, directly with server 110A or with another computing device in cloud control system 120. It will be understood that the user system 130 and user device 135 may be generally described with reference to computing system 200. For example, a user may access cloud 105 by going to a website and requesting that a statistical machine translation be performed, which is then executed by cloud control system 120 according to method 300.

Each of many potential users (e.g., hundreds or thousands) may configure one or more translations to run in cloud 105. Each translation places processing and other demands on the computing resources of cloud 105. For example, server 110A handles processing for a workload 115A, server 110B handles processing for a workload 115B, and server 110N handles processing for a workload 115N, as illustrated in FIG. 1.

Both the user system 130 and user device 135 may include any general purpose computing system that may implement a web browser application or other suitable applications adapted to request and provide information (such as web content) to and from cloud 105. A suitable example of the user system 130 and user device 135 may include the computing system 700 disclosed with reference to FIG. 7.

Figure 2:
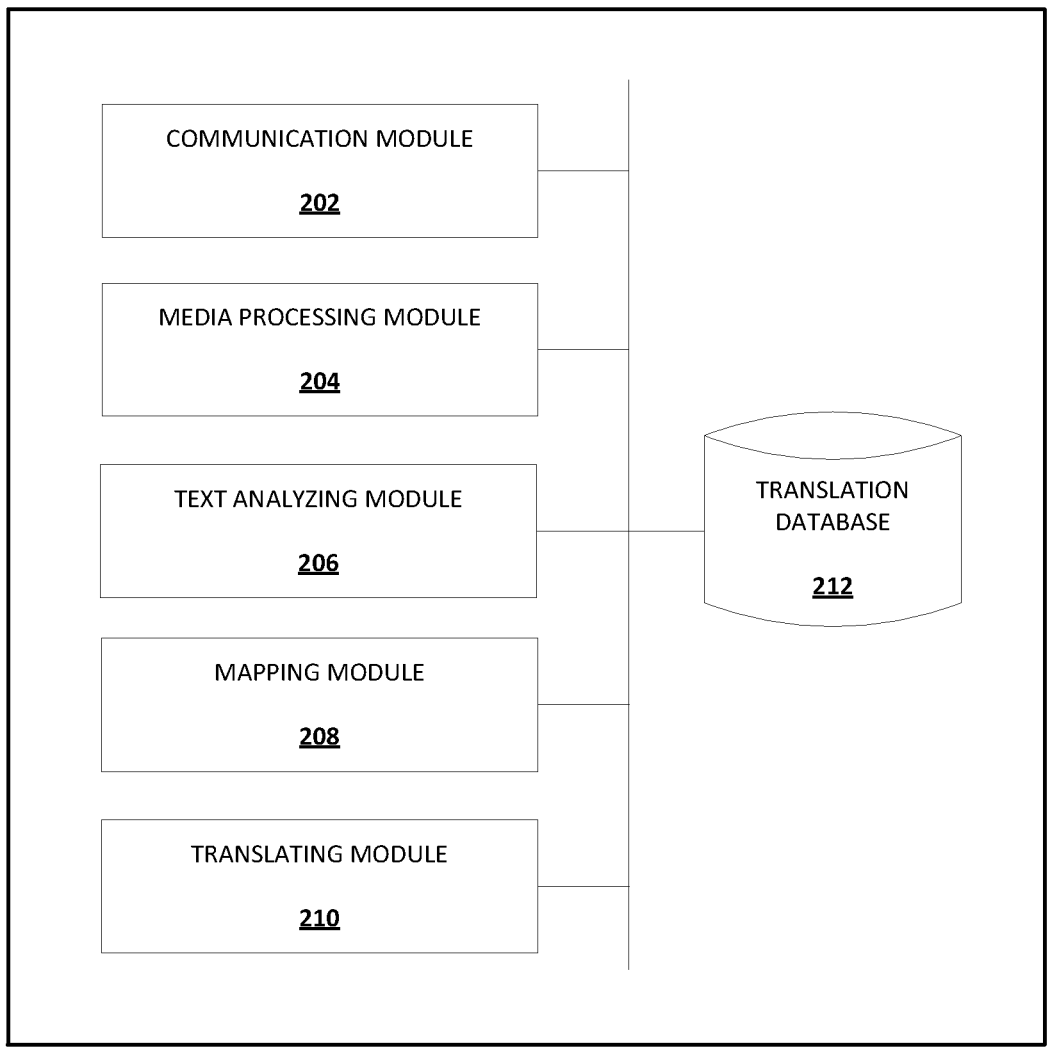
FIG. 2 is a block diagram of a computing system for implementing statistical machine translations, according to an exemplary embodiment.

FIG. 2 shows a block diagram of a computing system 200 configurable to perform statistical machine translations, according to an example embodiment. The computing system 200 may include a communication module 202, a media processing module 204, a text analyzing module 206, a mapping module 208, a translating module 210, and a translation database 212. Alternative embodiments of the computing system 200 may comprise more, less, and/or functionally equivalent modules. Furthermore, all modules can be integrated within a single system, or, alternatively, can be remotely located and optionally be accessed via a third party.

It will be appreciated by one of ordinary skill that examples of the foregoing modules may be virtual, and instructions said to be executed by a module may, in fact, be retrieved and executed by a processor. The foregoing modules may also include memory cards, servers, and/or computer discs. Although various modules may be configured to perform some or all of the various steps described herein, fewer or more modules may be provided and still fall within the scope of various embodiments.

The communication module 202, in some embodiments, may be configured to receive media to be translated from a user or a corresponding system/module, and to transmit translated media to the user or corresponding system/module. Media may include text, video, audio, web pages, and so forth. The received media may be in a source language (to be translated), and the outputted media may be in a target language (translated).

The media processing module 204 may be configured to perform pre-processing of the received media or post-processing of the outputted text. Specifically, when the media is received by the communication module 202, it may be (optionally) processed by the media processing module 204 to modify text, perform optical text/character recognition, speech recognition, parsing, de-formatting, determining of the source language, noise eliminating, and so forth, depending on a particular application. The pre-processing can be performed to convert the text to be translated into a format suitable for statistical MT. The media processing module 204 may perform the reverse process when the source text is translated into the target language.

The text analyzing module 206 may be configured to perform morphological, syntactic and semantic analysis of the received and pre-processed text in the source language. This approach may help in determining the source language and characteristics of used words.

The mapping module 208 may be configured to map words/phrases in the source language to a set of candidate translation words/phrases in the target language, and to determine translation parameters. The candidate translation words/phrases in the target language may be derived from the translation database 212 using predetermined rules or criteria.

The translating module 210 may be configured to translate each word/phrase in the source language into one of the mapped words/phrases of the target language in the set. Without providing too much detail, translation is performed by an intelligent selection of mapped words/phrases based on a predetermined translation algorithm and methodology. Once translating module 210 performs the translation, the translated text may be delivered to the media processing module 204 for further post-processing and to the communication module 202 for delivering the translated media to the user or a corresponding system.

The translation database 212 may store translation data such as bilingual text corpora (e.g., the Canadian Hansard corpus, or the like), translation parameters, and criteria for conducting translations. The translation database 212 may be accessed by one or more modules 202-210 of the computing system 200.

Figure 3:
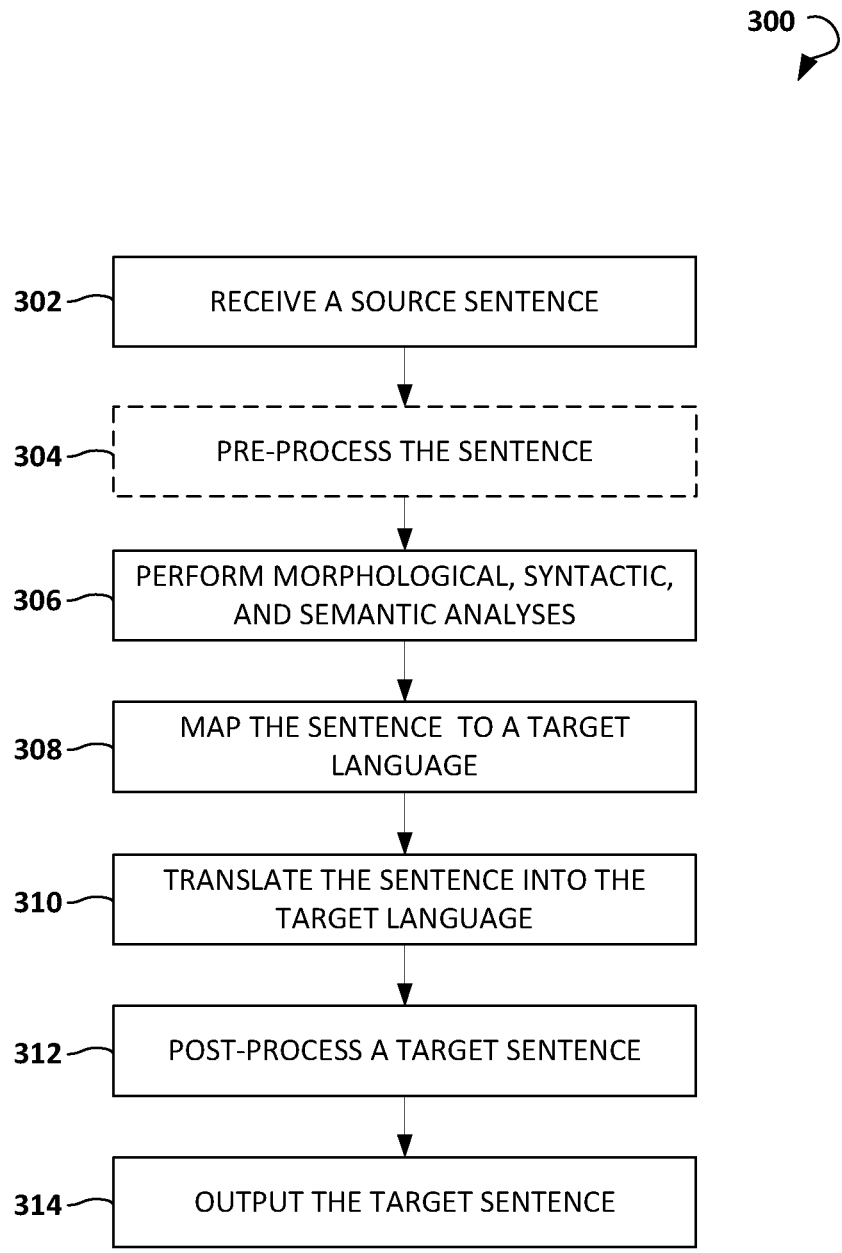
FIG. 3 is a flow chart of a general method for statistical machine translation, according to an exemplary embodiment.

FIG. 3 shows a general method 300 for statistical machine translation, according to an example embodiment. The method 300 may be performed by processing logic that may comprise hardware (e.g., dedicated logic, programmable logic, and microcode), software (such as software run on a general-purpose computer system or a dedicated machine), or a combination of both. In one example embodiment, the processing logic resides on or is implemented as the computing system 200.

The method 300 may commence at operation 302 when a source sentence is received within the translation process and, generally, within the processing logic for performing the translation process. For simplicity, the method 300 is said to operate on source sentences; however, those skilled in the art would appreciate that single words or phrases can be used in the translation process. As used hereinafter, the terms "source unit" and "translation unit" refer to words, phrases, and sentences. In addition, the source sentence may refer to a variety of media such as speech, text, audio/video, Internet content (such as web pages), and the like. Text transcription may be input by a speech recognition process, a character recognition process, or other process for transcribing text. The media to be translated may be stored in a memory for further processing.

At operation 304, the processing logic may optionally pre-process the received source sentences. The pre-processing may comprise de-formatting, parsing, character recognition processing, determining the language used, eliminating noise, reordering, segmenting, and so forth. In other words, pre-processing at operation 304 may be utilized for preparing received source sentences for further translation.

At operation 306, morphological, syntactic and semantic analyses may be performed. A morphological analysis may determine a word from inflections, tense, number, and part of speech. A syntactic analysis may determine whether a word is a subject or an object. A semantic analysis may determine a proper interpretation of a sentence from the results produced by the syntactic analysis. The syntactic and semantic analysis may be executed simultaneously and produce a syntactic tree structure and a semantic network, respectively. As a result, the internal structure of the sentence may be determined.

At operation 308, the internal sentence structure may be mapped to a target language. Thus, each part of the source sentence may be assigned one or more parts of the target language. At operation 310, each word (phrase) of the source language may be translated to the mapped word (phrase) of the target language. Specifically, at this operation, different statistical translation models may be used to select one or more of the mapped chunks related to the target language.

At operation 312, the processing logic may optionally perform post-processing to reorder words (phrases), generate the sentence in the target language, and so forth. At the next operation 314, the target sentence is outputted.

In other embodiments, the method 300 of statistical machine translation may include additional, fewer, or different operations for various applications.

Following is a more detailed discussion of certain terms and certain operations that appear in FIG. 3. In addition, MT parameter tuning and MT training processes will be described.

Tuning

Table 1 shows two examples of statistical machine translations from French to English. Now the tuning concept will be described with reference to these two examples.

Table 1 Examples of statistical machine translations from French to English

| Source Sentence | | Candidate Translations | | | |
|---|---|---|---|---|---|
| i | f(i) | j | e(i; j) | x(i; j) | $h_w(i; j)$ | g(i; j) |
| 1 | "il ne va pas" | 1 | "he goes not" | [2 4] | 0 | 0.28 |
| | | 2 | "he does not go" | [3 8] | 2 | 0.42 |
| | | 3 | "she not go" | [6 1] | −11 | 0.12 |
| 2 | "je ne vais pas" | 1 | "I go not" | [−3 −3] | 3 | 0.15 |
| | | 2 | "we do not go" | [1 −5] | −7 | 0.18 |
| | | 3 | "I do not go" | [−5 −3] | 7 | 0.34 |

The space of candidate translation sentences is defined as a tuple $\langle \Delta, I, J, f, e, x \rangle$, where:

$\Delta$ is a positive integer referred to as the dimensionality of the space;

I is a (possibly infinite) set of positive integers, referred to as sentence indices;

J maps each sentence index to a (possibly infinite) set of positive integers, referred to as candidate indices;

f maps each sentence index to a sentence from the source language;

e maps each pair $\langle i, j \rangle \in I \times J(i)$ to the $j^{th}$ target-language candidate translation of source sentence f(i); and x maps each pair $\langle i, j \rangle \in I \times J(i)$ to a $\Delta$-dimension feature vector representation of e(i; j).

As used herein, the feature vector is a $\Delta$-dimensional vector of numerical features that represent any text object. Many algorithms in machine learning require a numerical representation of objects, since such representations facilitate processing and statistical analysis. As an example, when representing texts, the feature values might correspond to term occurrence frequencies.

The example candidate space has two source sentences, three candidate translations for each source sentence, and feature vectors of dimension 2. It is an example of a finite candidate space, defined as a candidate space for which I is finite and J maps each index of I to a finite set.

A policy of candidate space $\langle \Delta, I, J, f, e, x \rangle$ is a function that maps each member $i \in I$ to a member of J(i). The policy corresponds to a choice of one candidate translation for each source sentence. For the example of Table 1, policy $p_1 = \{1 \rightarrow 2; 2 \rightarrow 3\}$ corresponds to the choice of "he does not go" for the first source sentence and "I do not go" for the second source sentence. Some policies may be better than others. Policy $p_2 = \{1 \rightarrow 3; 2 \rightarrow 1\}$ corresponds to the inferior translations "she not go" and "I go not."

According to various embodiments of the present technique, the MT system distinguishes policies using a scoring function for candidate translations of the form:

$$h_w(i,j) = w \cdot x(i,j) \qquad \text{Eq. 2}$$

where w is a weight vector of the same dimension as feature vector x(i, j). This scoring function extends to the policy p by summing the cost of each of the policy's candidate translations:

$$H_w(p) = \Sigma_{i \in I} h_w(i, p(i)) \qquad \text{Eq. 3}$$

As can be seen in Table 1, if w=[−2; 1] is used, $H_w(p_1)=9$ and $H_w(p_2)=-8$.

The process of estimating the weight vector w is called parameter optimization, parameter tuning, or just tuning.

In other words, the goal of tuning is to learn to weight vector w such that $H_w(p)$ assigns a high score to good policies and a low score to bad policies. To do so, according to the present technique, a "gold" scoring function G can be used. The G function maps each policy to a real-valued score. This gold function can be referred to a score of the BLEU algorithm.

BLEU is an algorithm for evaluating the quality of text which has been machine translated from one natural language to another. Quality is considered to be the correspondence between a machine's output and that of a human: the closer a machine translation is to a professional human translation, the better it is.

BLEU scores are calculated for individual translated segments by comparing them with a set of good quality reference translations. Those scores are then averaged over the whole corpus to reach an estimate of the translation's overall quality. Thus, BLEU is designed to approximate human judgment at a corpus level, and performs badly if used to evaluate the quality of individual sentences. BLEU's output is always a number between 0 and 1. This value indicates how similar the candidate and reference texts are, with values closer to 1 representing more similar texts.

The approach of the present technique is directed to find a weight vector w such that $H_w$ behaves "similarly" to the G function on a candidate space s. To simplify the concept of "similarity," a loss function $l_s(H_w; G)$ can be introduced, which returns the real-valued loss of using scoring function Hw when the gold scoring function is G, and the candidate space is s. Thus, the goal of tuning is to find a weight vector w that minimizes loss.

MERT Algorithm

Current statistical machine translation systems use log-linear models to estimate the probability of source sentence translations. It is recognized that such systems return the most probable translation. The log-linear models are parameterized, and tuning is the process of finding the optimal set of parameters, given some metric, for these log-linear models. Some approaches exist, of which MERT is the most prominent.

Referring now to the terms of provided tuning examples, in general, the candidate space may have infinite source sentences, as well as infinite candidate translations per source sentence. In practice, tuning may optimize a finite subset of source sentences and a finite subset of candidate translations, as well.

The classic tuning architecture used in the MERT approach forms this subset of candidate translations and learns the weight vector w via a feedback loop consisting of two phases.

The first phase is the candidate generation process. At this phase, candidate translations are selected from a base candidate space s and added to a finite candidate space s' called a candidate pool.

The second phase is the optimization process. At this phase, the weight vector w is optimized to minimize loss $l_s'(H_w,G)$.

For its candidate generation phase, MERT generates the k-best candidate translations for each source sentence according to $h_w$, where w is the weight vector from the previous optimization phase (or an arbitrary weight vector for the first iteration).

For its optimization phase, MERT defines the loss function as follows:

$$l_s(H_w, G) = \max_p G(p) - G(\operatorname{argmax}_p H_w(p)) \qquad \text{Eq. 4}$$

In other words, MERT defines weight vectors w such that the "gold" function G scores $H_w$'s best policy as highly as possible (if $H_w$'s best policy is the same as G's best policy, then there is zero loss). Typically, the optimization phase is implemented using a line-optimization algorithm developed by Franz Josef Och in 2003. However, such algorithm, or its more developed analogues, provides satisfactory results when a candidate space with low dimensionality Δ is used. It was shown that as the dimensionality increases, the classical MERT rapidly loses the ability to learn w.

Optimization via Ranking

MERT, as well as other existing algorithms, is focused on getting a single sentence in the k-best candidate translation list. As mentioned, this is the sentence with the highest "gold" scoring function (or the highest BLEU score). However, determining the highest "gold" scoring function may not be performed well with the training/tuning algorithm, since the highest "gold" scoring function for one tested sentence may not be such for another tested sentence.

Various embodiments disclosed herein address the optimization phase of the MERT algorithm to train it to perform well for high-dimensionality candidate spaces. Practically, the present technique trains MERT by modifying the optimization process based on a ranking approach.

Assume that the gold scoring function G decomposes in the following way:

$$G(p) = \sum_{i \in I} g(i, p(i)) \qquad \text{Eq. 5}$$

where g(i, j) is a local scoring function that scores the single candidate translation e(i, j). In Table 1, an example g was shown. For an arbitrary pair of candidate translations e(i, j) and e(i, j'), the local gold function g tells which is the better translation. It should be noted that this induces a ranking on the candidate translations for each source sentence.

According to the present technique, the pair-wise approach to ranking can be used. However, those skilled in the art would appreciate that other ranking approaches can be used, such as point-wise, list-wise, and so forth.

In the pair-wise approach, the learning task is framed as the classification of candidate pairs into two categories: correctly ordered and incorrectly ordered. Specifically, for candidate translation pair e(i, j) and e(i, j'):

$$g(i,j) > g(i,j') \Leftrightarrow h_w(i,j) > h_w(i,j'). \qquad \text{Eq. 6}$$

These expressions can be re-expressed as follows:

$$\Leftrightarrow h_w(i,j) - h_w(i,j') > 0 \qquad \text{Eq.7}$$

$$\Leftrightarrow w \cdot x(i,j) - w \cdot x(i,j') > 0 \qquad \text{Eq.8}$$

$$\Leftrightarrow w \cdot (x(i,j) - x(i,j')) > 0 \qquad \text{Eq.9}$$

Thus, optimization reduces to a classic binary classification problem. The present technique involves creating a labeled training instance for this problem by computing a difference vector x(i, j)−x (i, j'), and labeling it as a positive or negative instance based on whether, respectively, the first or second vector is superior according to the gold function g. For example, given the candidate space of Table 1, since g(1, 1)>g(1, 3), we would add ([−4, 3], +) to the training set. Thereafter, this training data can be fed directly to any off-the-shelf classification tool that returns a linear classifier in order to obtain a weight vector w that optimizes the above condition. This weight vector can then be used directly by the MT system in the subsequent candidate generation phase. It should also be understood that the exact loss function $l_s'(H_w, G)$ optimized depends on the choice of classifier.

Sampling

The pairwise nature of the approach described above creates problems with enumerating millions or even billions of pairs of feature vectors. Practically, it is not feasible to iterate all possible pairs of feature vectors in the optimizing process within reasonable timeframes.

The present technique, according to various embodiments, involves taking samples of pairs of feature vectors from the candidate spaces and evaluating each of these samples. It was shown that this approach gives great simplicity to the overall tuning process.

More specifically, for each source sentence i, a sampler, according to one embodiment, generates $\Gamma$ candidate translation pairs $\langle j, j' \rangle$ and accepts each pair with probability $\alpha_i(|g(i, j) - g(i, j')|)$. Among the accepted pairs, it keeps the $\Xi$ pairs with the greatest score differential and adds these to the training data. The pseudocode can be expressed as follows:

1: $V = \langle \rangle$
2: For $\Gamma$ samplings do
3: Choose $\langle j, j' \rangle \in J(i) \times J(i)$ uniformly at random.
4: With probability $\alpha_i(|g(i, j) - g(i, j')|)$, add $(|x(i,j) - x(i,j')|, \text{sign}(g(i,j) - g(i,j')|)$ and $(|x(i,j') - x(i,j)|, \text{sign}(g(i,j') - g(i,j)|) \text{to } V$ 5: Sort V decreasingly by $|g(i, j) - g(i, j')|$
6: Return the first $\Xi$ members of V.

Those who are skilled in the art would appreciate that many different ways to perform sampling exist, and the provided embodiments serve merely as an example.

Figure 4:
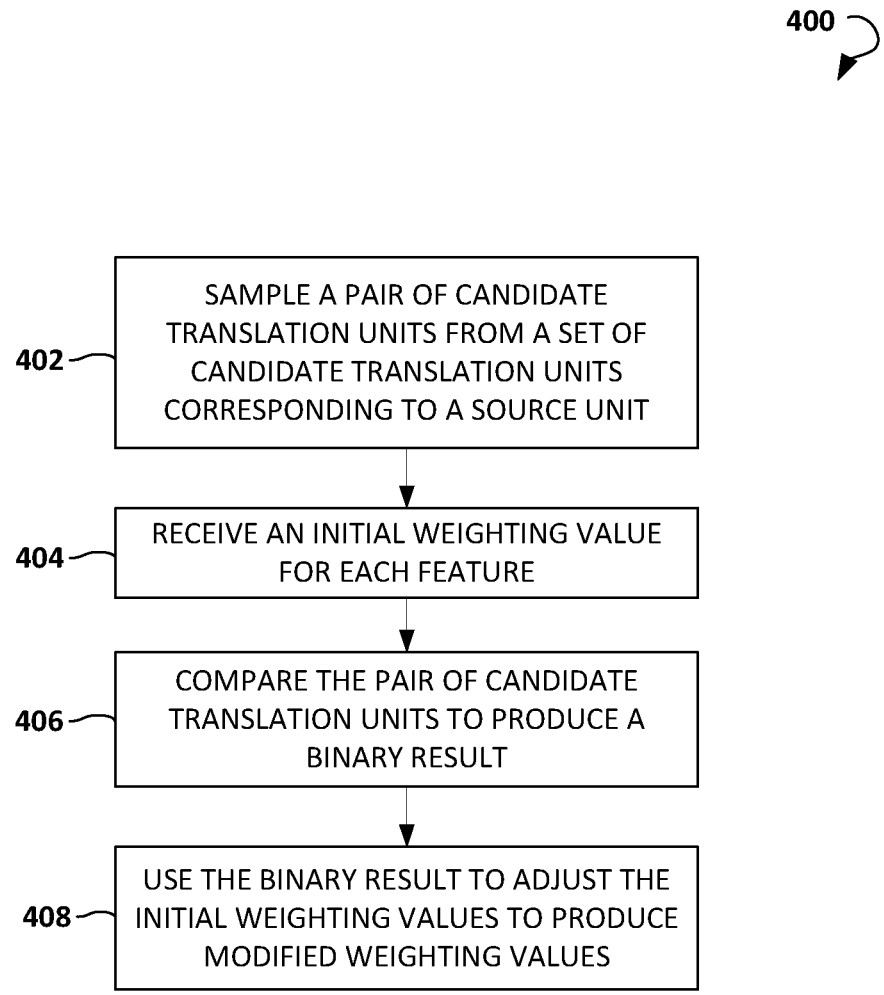
FIG. 4 is a flow chart of a statistical machine translation parameter tuning, according to an exemplary embodiment.

Referring now to FIG. 4, it shows the method 400 of statistical machine translation parameter tuning, according to an example embodiment. The method 400 may be performed by processing logic that may comprise hardware (e.g., dedicated logic, programmable logic, and microcode), software (such as software run on a general-purpose computer system or a dedicated machine), or a combination of both. In one example embodiment, method 400 may be implemented at the computing system 200 shown in FIG. 2.

The method 400 may commence at operation 402 with the processing logic sampling a pair of candidate translation units from a set of candidate translation units corresponding to a source unit. Each candidate translation unit may correspond to numeric values assigned to one or more features and a set of candidate translation units may be generated for each source unit. As used herein, source units may refer to words, phrases and sentences. This set was previously mentioned as a "candidate pool." In one example embodiment, the set is generated based on the intelligent selection of one or more candidate translation units from a translation database. For instance, text corpora such as the Canadian Hansard corpus can be used.

At operation 404, an initial weighing value for each feature can be received. According to various embodiments, the initial weighing value may refer to one or more of candidate translation space policy, dimensionality of the candidate translation space, a feature vector, a scoring function, a BLEU score, a weight vector, and a loss function. One or more of the mentioned weighing values can be derived from each other.

At operation 406, the pair of candidate translation units can be compared to produce a binary result. At operation 408, this binary result may be used to adjust the initial weighting values to produce modified weighting values. This can be achieved, for example, by assigning a vector to each of the pair of candidate translation units, the vector including a set of values, each value corresponding to a parameter. The candidate translation unit vectors may be subtracted, and the resultant vector may be labeled with a value of 1 (if the first candidate translation unit is a better translation than the second candidate translation unit) or −1 (if the first candidate translation unit is a worse translation than the second candidate translation unit). Once the resultant vector is labeled, the value associated with the resultant vector may be used to adjust the initial weighting values (e.g., by adding or subtracting 1 to/from one or more initial weighing values). The methodology used to adjust weighting values may be selected from one or more of pair-wise ranking, linear binary classification, logistic regression classification, maximum entropy classification, iterative classification, and any other appropriate machine learning algorithms. According to the present technique, the weighting values are adjusted such that those candidate translation units having a higher relevancy for correct translation of the source units are associated with one or more of the minimized loss function, the highest weight vector, and the best candidate translation space policy.

Figure 5:
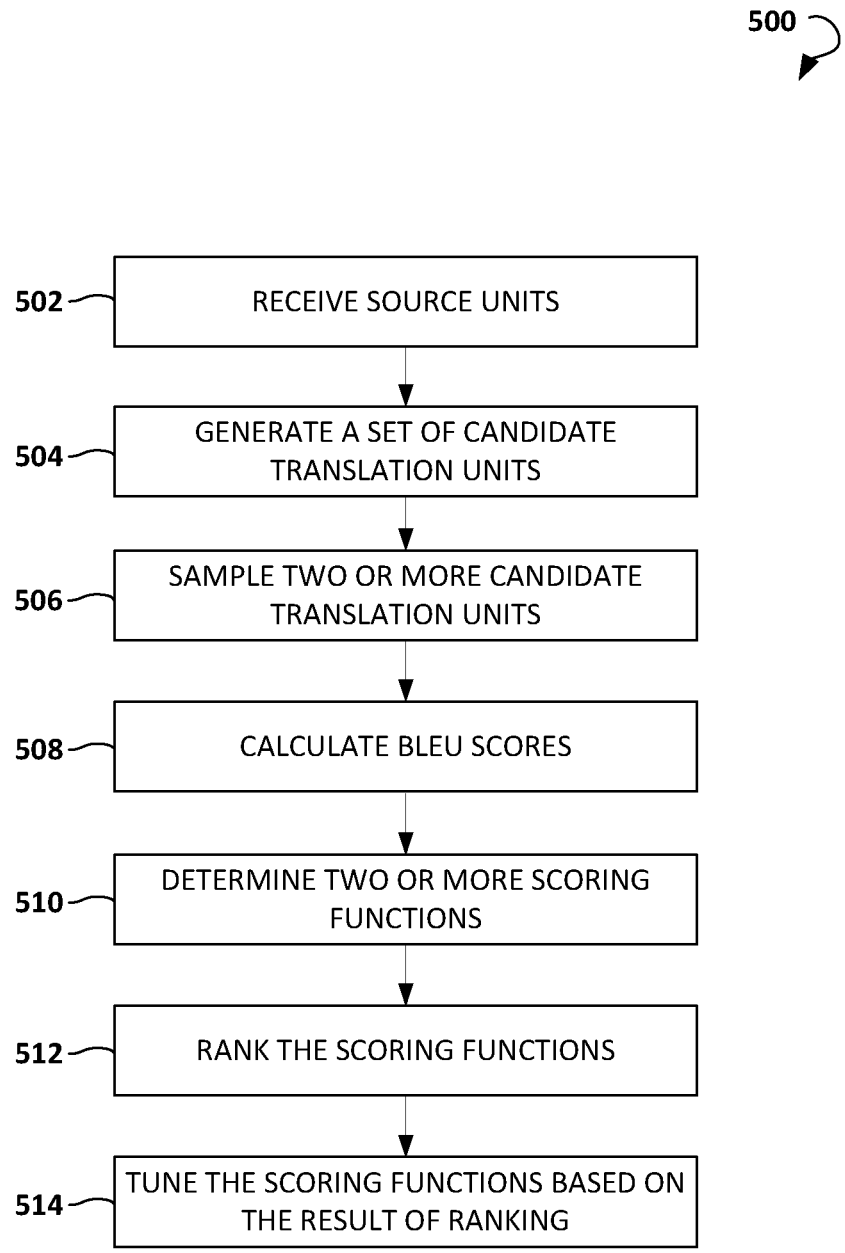
FIG. 5 is a flow chart of a method of statistical machine translation parameter tuning, according to another exemplary embodiment.

FIG. 5 shows a method 500 for statistical machine translation parameter tuning, according to another example embodiment. The method 500 may be performed by processing logic that may comprise hardware (e.g., dedicated logic, programmable logic, and microcode), software (such as software run on a general-purpose computer system or a dedicated machine), or a combination of both. In one example embodiment, the processing logic to perform the method 500 may be implemented as the computing system 200 shown in FIG. 2.

The method 500 may commence at operation 502 when one or more source units to be translated are received by the processing logic. As used herein, units may refer to words, phrases and sentences. At the next operation 504, a set of candidate translation units is generated for each source unit.

At operation 506, two or more candidate translation units are sampled. At operation 508, BLEU scores for each candidate translation unit are calculated. And at the next operation 510, scoring functions for the candidate translation units are determined.

At operation 512, the scoring functions are ranked for the sampled candidate translation units. As mentioned above, the ranking may refer to one or more of pair-wise ranking, pointwise ranking, listwise ranking, or other ranking approaches and may involve linear binary classification, logistic regression classification, maximum entropy classification, iterative classification, and any other appropriate machine learning techniques.

According to the example embodiment, the scoring functions are ranked such that those candidate translation units having higher relevancy for correct translation of the source units are associated with one or more of the minimized loss function, the highest weight vector, and the best candidate translation space policy.

At operation 514, the scoring functions are tuned based on the result of ranking such that the statistical machine translation method is trained.

Experiments

To understand the effectiveness of the present technique, comparative experiments were performed with relation to the traditional MERT algorithm and the MERT algorithm using PRO, as described above. The particulars of the experiment are as follows:

1. The "gold" scoring function G was created. This is a linear function of the same form as $H_w$, i.e., $G(p)=H_{w^*}(p)$ for some "gold" weight vector w*. Under this assumption, the role of the optimization phase reduces to learning back the gold weight vector w*.

2. The Δ-dimensionality candidate pool was created with 500 source "sentences" and 100 candidate "translations" per sentence. The corresponding feature vectors were created by drawing Δ random real numbers uniformly from the interval [0; 500].

3. Then, the classic MERT's linear optimization was run on this synthetic candidate pool, and the learned weight vector w was compared to the gold weight vector w* using cosine similarity.

Figure 6:
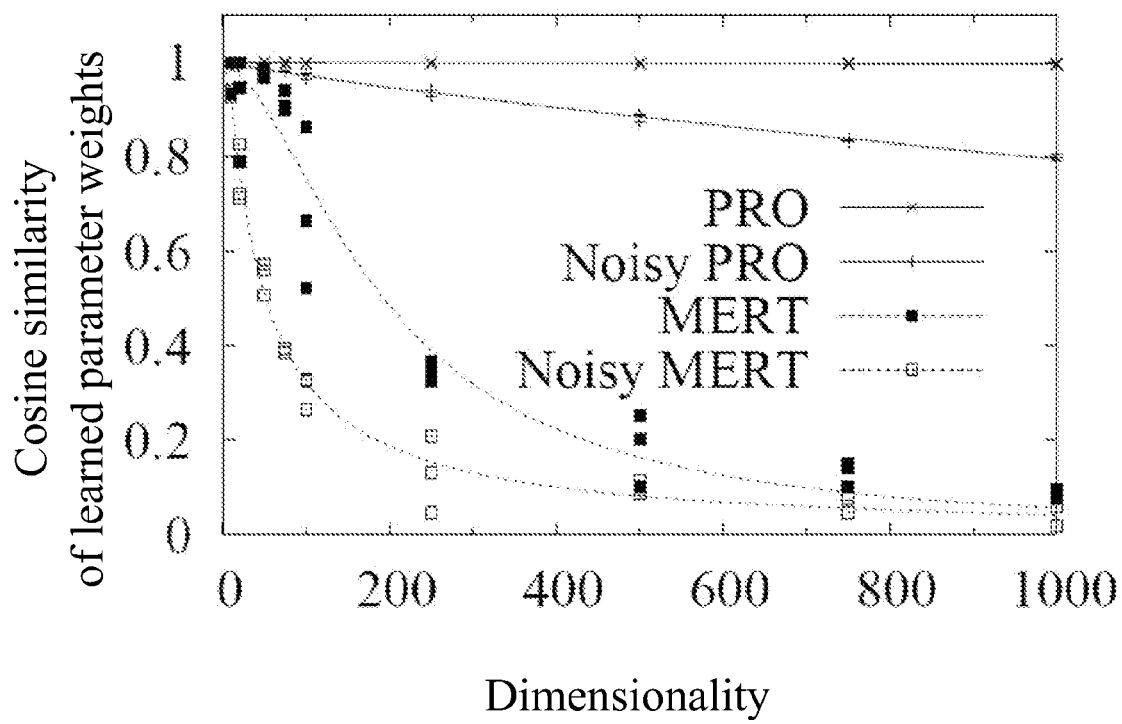
FIG. 6 illustrates the results of a synthetic data learning experiment for MERT and PRO, with and without added noise, according to certain embodiments.

MERT was run by generating 20 random starting weight vectors and hill-climbing on each vector independently until no further progress was made, then choosing the final weight vector that minimized loss. Various dimensionalities were tried from 10 to 1000. Each setting was repeated three times, generating different random data each time. FIG. 6 provides the results of this experiment. For each repetition of each setting, the cosine similarity of the learned w and the gold w* is plotted as a function of dimensionality, and a regression curve is fitted to the points. The results shown in FIG. 6, under the caption "MERT", indicate that as the dimensionality of the problem increases, MERT rapidly loses the ability to learn w*.

It should be noted that this synthetic problem is considerably easier than a real MT scenario, where the data is noisy and interdependent, and the "gold" scoring function is non-linear. If MERT cannot scale in this simple scenario, it has little hope of succeeding in a high-dimensionality deployment scenario.

Thereafter, the same data experiment was performed for the MERT using the pair-wise ranking optimization (PRO) approach, as described herein with reference to FIG. 3 and FIG. 4. Throughout all experiments with PRO, Γ=5000, Ξ=50, and the following step function for each $α_i$ was used:

$$\alpha(n) = \begin{cases} 0 & \text{if } n < 0.05 \\ 1 & \text{otherwise} \end{cases} \quad \text{Eq. 10}$$

In this experiment, the MegaM software was used (i.e., the maximum entropy classification software developed by Hal Daumé in 2004) as a binary classifier and was run "out of the box" (i.e., with all default settings for binary classification). The results of this experiment are also shown in FIG. 6, under the caption "PRO". FIG. 6 shows that PRO is able to learn w* nearly perfectly at all dimensionalities from 10 to 1000.

In a realistic machine translation scenario the relationship between g and $h_w$, would not be so close. To encourage a disconnect between g and $h_w'$ and make the synthetic scenario look more like MT reality, the synthetic experiments described above were repeated but noise was added to each feature vector, drawn from a zero-mean Gaussian with a standard deviation of 500. The noise makes the ability of a system to learn w* much more difficult. The results of the noisy synthetic experiments, also shown in FIG. 6 (the lines labeled "Noisy"), show that the pair-wise ranking approach is less successful than before at learning w* at high dimensionality, but still greatly outperforms MERT.

Figure 7:
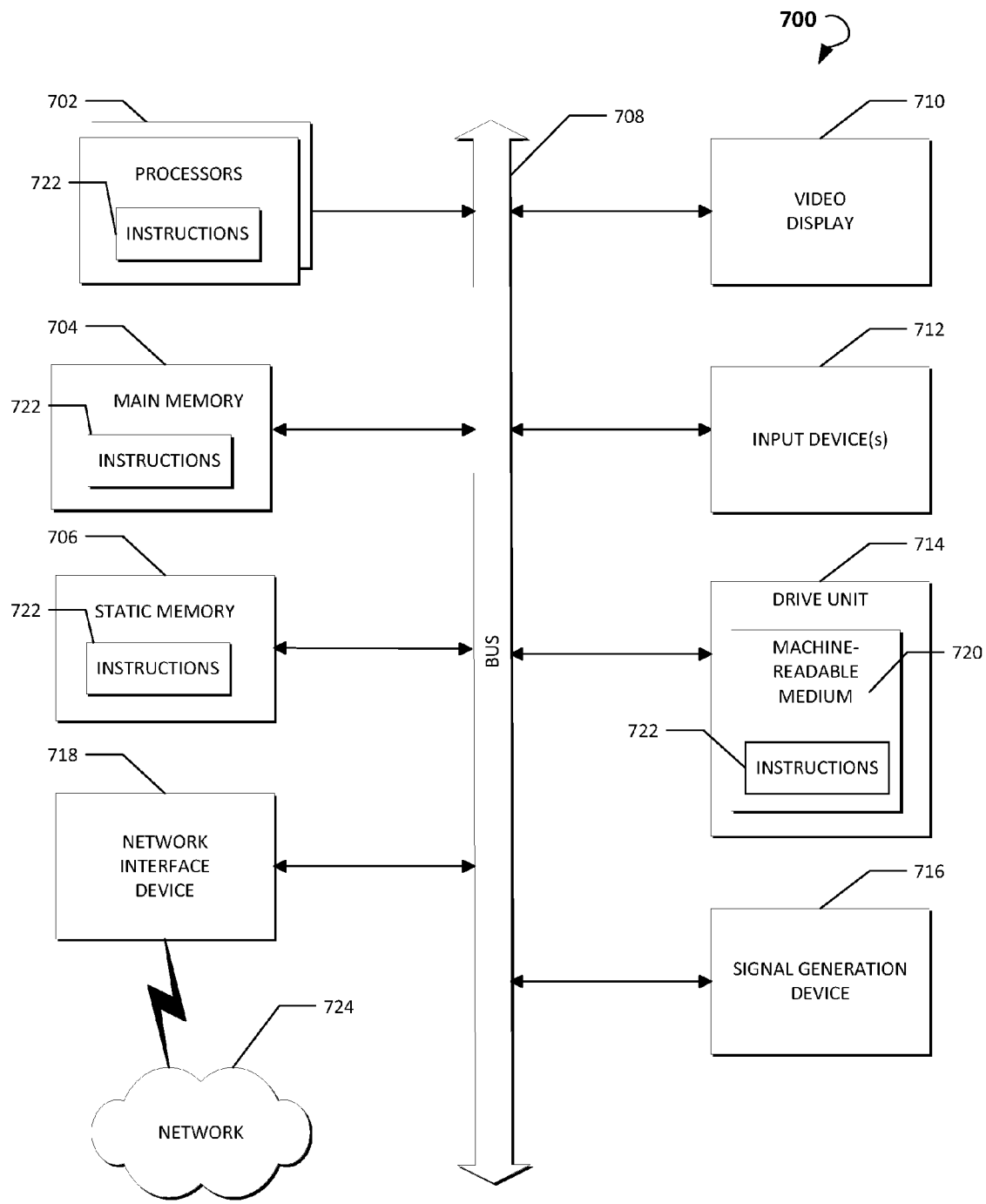
FIG. 7 is a diagrammatic representation of an example machine in the form of a computer system within which a set of instructions, for the machine to perform any one or more of the methodologies discussed herein, is executed.

FIG. 7 shows a diagrammatic representation of a computing device for a machine in the example electronic form of a computer system 700, within which a set of instructions for causing the machine to perform any one or more of the methodologies discussed herein can be executed. In various example embodiments, the machine operates as a standalone device or can be connected (e.g., networked) to other machines. In a networked deployment, the machine can operate in the capacity of a server or a client machine in a server-client network environment, or as a peer machine in a peer-to-peer (or distributed) network environment. The machine can be a personal computer (PC), a tablet PC, a set-top box (STB), a Personal Digital Assistant (PDA), a cellular telephone, a portable music player (e.g., a portable hard drive audio device, such as an Moving Picture Experts Group Audio Layer 3 (MP3) player), a web appliance, a network router, a switch, a bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor or multiple processors 702 (e.g., a central processing unit (CPU), a graphics processing unit (GPU), or both), and a main memory 704 and a static memory 706, which communicate with each other via a bus 708. The computer system 700 can further include a video display unit 710 (e.g., a liquid crystal display (LCD) or a cathode ray tube (CRT)). The computer system 700 also includes at least one input device 712, such as an alphanumeric input device (e.g., a keyboard), a cursor control device (e.g., a mouse), a microphone, and so forth. The computer system 700 also includes a disk drive unit 714, a signal generation device 716 (e.g., a speaker), and a network interface device 718.

The disk drive unit 714 includes a machine-readable medium 720, which stores one or more sets of instructions and data structures (e.g., instructions 722) embodying or utilized by any one or more of the methodologies or functions described herein. The instructions 722 can also reside, completely or at least partially, within the main memory 704 and/or within the processors 702 during execution thereof by the computer system 700. The main memory 704 and the processors 702 also constitute machine-readable media.

The instructions 722 can further be transmitted or received over a network 724 via the network interface device 718 utilizing any one of a number of well-known transfer protocols (e.g., Hyper Text Transfer Protocol (HTTP), CAN, Serial, and Modbus).

While the computer-readable medium 720 is shown in an example embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media. Such media can also include, without limitation, hard disks, floppy disks, flash memory cards, digital video disks, random access memory (RAM), read only memory (ROM), and the like.

The example embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software programs for implementing the present method can be written in any number of suitable programming languages such as, for example, Hypertext Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, Perl, UNIX Shell, Visual Basic or Visual Basic Script, Virtual Reality Markup Language (VRML), ColdFusion™ or other compilers, assemblers, interpreters or other computer languages or platforms.

Thus, systems and methods for statistical machine translation parameter tuning based on a ranking of translation parameters are disclosed. The disclosed technology provides a simple approach to tuning translation parameters that scales similarly to high-dimensional feature spaces. The authors have demonstrated that the technique exhibits reliable behavior, scales gracefully to high-dimensional feature spaces, and can be remarkably easy to implement with existing MT software.

Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A computer-implemented method for statistical machine translation (MT) weight tuning, the method comprising:
  executing instructions stored in memory by a processor to:
    sample a pair of candidate translation units from a set of candidate translation units corresponding to a source unit, each candidate translation unit corresponding to unique numeric values assigned to one or more features;
    receive an initial weighting value for each feature;
    compare the pair of candidate translation units to produce a binary result; and
    use the binary result to adjust the initial weighting values to produce modified weighting values using the processor.

2. The method of claim 1, further comprising:
  calculating BLEU (Bilingual Evaluation Understudy) scores for each candidate translation unit; and
  determining scoring functions for the candidate translation units.

3. The method of claim 1, further comprising ranking the initial weighting values for two or more candidate translation units, wherein the ranking is based on a ranking of results of scoring functions for one or more pairs of candidate translation units.

4. The method of claim 3, wherein the ranking is applied to translation parameters of the sampled candidate translation units.

5. The method of claim 3, wherein the ranking comprises one or more of the following: a pair-wise ranking, a linear binary classification, a logistic regression classification, a maximum entropy classification, and an iterative classification.

6. The method of claim 1, wherein the sampling comprises:
  generating a plurality of candidate translation unit pairs;
  assigning a probability coefficient to each candidate translation unit pair; and
  selecting the candidate translation unit pairs having the highest score differential.

7. The method of claim 1, wherein the source unit and candidate translation units comprise one or more of the following: a word, a phrase, and a sentence.

8. The method of claim 6, wherein the generating of the set of candidate translation units comprises selecting one or more candidate translation units from a translation database.

9. The method of claim 1, wherein the translation parameters, associated with the candidate translation units, comprise one or more of the following: a candidate translation space policy, a scoring function, a BLEU score, a weight vector, and a loss function.

10. The method of claim 9, wherein the translation parameters are ranked such that candidate translation units having higher relevancy for a correct translation of the source units are associated with one or more of the following: a minimized loss function, a highest weight vector, and a best candidate translation space policy.

11. A system for statistical machine translation (MT) parameter tuning, the system comprising:
  a memory for storing executable instructions for tuning statistical MT parameters; and
  a processor for executing the executable instructions stored in memory, the executable instructions comprising:
    a text analyzing module to sample a pair of candidate translation units from a set of candidate translation units corresponding to a source unit, each candidate translation unit corresponding to numeric values assigned to one or more features;
    a communication module to receive an initial weighting value for each feature;
    a mapping module comparing the pair of candidate translation units to produce a binary result; and
    a translating module to adjust the initial weighting values to produce modified weighting values based on the binary result.

12. The system of claim 11, wherein the translating module is further configured to:
  calculate BLEU (Bilingual Evaluation Understudy) scores for each candidate translation unit; and
  determine scoring functions for the candidate translation units.

13. The system of claim 11, further comprising ranking the initial weighting values for two or more candidate translation units, wherein the ranking is based on a ranking of results of scoring functions for one or more pairs of candidate translation units.

14. The system of claim 13, wherein the translating module is further configured to sample two or more candidate translation units, wherein the ranking is applied to translation parameters of the sampled candidate translation units.

15. The system of claim 13, wherein the ranking comprises one or more of the following: a pair-wise ranking, a linear binary classification, a logistic regression classification, a maximum entropy classification, and an iterative classification.

16. The system of claim 11, wherein the source unit and candidate translation units comprise one or more of the following: a word, a phrase, and a sentence.

17. The system of claim 11, wherein generating of the set of candidate translation units comprises selecting one or more candidate translation units from a translation database.

18. The system of claim 11, wherein the translation parameters associated with the candidate translation units comprise one or more of the following: a candidate translation space policy, a scoring function, a BLEU score, a weight vector, and a loss function.

19. The system of claim 18, wherein the translation parameters are ranked so that candidate translation units having higher relevancy for a correct translation of the source units are associated with one or more of the following: a minimized loss function, a highest weight vector, and a best candidate translation space policy.

20. The system of claim 11, wherein the processor executes the executable instructions under direction of a cloud control system, the cloud control system managing a cloud.

21. A computer-readable medium having instructions stored thereon, which when executed by one or more computers, causes the one or more computers to:
sample a pair of candidate translation units from a set of candidate translation units corresponding to a source unit, each candidate translation unit corresponding to unique numeric values assigned to one or more features;
receive an initial weighting value for each feature;
compare the pair of candidate translation units to produce a binary result; and
use the binary result to adjust the initial weighting values to produce modified weighting values.

* * * * *